(12) United States Patent
Lim et al.

(10) Patent No.: US 12,160,835 B2
(45) Date of Patent: Dec. 3, 2024

(54) MAXIMUM POWER REDUCTION

(71) Applicant: LG Electronics Inc., Seoul (KR)

(72) Inventors: Suhwan Lim, Seoul (KR); Yoonoh Yang, Seoul (KR); Sangwook Lee, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 17/739,306

(22) Filed: May 9, 2022

(65) Prior Publication Data

US 2022/0369241 A1 Nov. 17, 2022

Related U.S. Application Data

(60) Provisional application No. 63/187,284, filed on May 11, 2021.

(51) Int. Cl.
*H04W 52/30* (2009.01)

(52) U.S. Cl.
CPC ................................. *H04W 52/30* (2013.01)

(58) Field of Classification Search
CPC ..................................................... H04W 52/30
See application file for complete search history.

(56) References Cited

U.S. PATENT DOCUMENTS

2015/0245302 A1   8/2015   Lim et al.

FOREIGN PATENT DOCUMENTS

KR   10-2053232 B1   12/2019

OTHER PUBLICATIONS

ZTE Corporation, "Discussion on PC2 intra-band non-contiguous NR CA", 3GPP TSG-RAN WG4 Meeting # 98-e, Jan. 25-Feb. 5, 2021, R4-2102185.
LG Electronics, "MPR initial results for NR PC2 intra-band contiguous CA UE according to RF architecture", 3GPP TSG-RAN WG4 Meeting # 98BIS-e, Apr. 12-20, 2021, R4-2105325.
Huawei, HiSilicon, "Update of E-UTRA TDD configuration for overlapping UL transmission", Change Request, 3GPP TSG-RAN5 Meeting #91-e, May 17-28, 2021, R5-213018.
Huawei, HiSilicon, "Update of TDM pattern configuration in EN-DC MOP and A-MPR cases", Change Request, 3GPP TSG-RAN5 Meeting #91-e, May 17-28, 2021, R5-213019.
LG Electronics, "CR for NS_04 A-MPRIM3 for B41/n41 intra-band EN-DC in Rel-16", 3GPP TSG-RAN WG4 Meeting #95-e, May 25-Jun. 5, 2020, R4-2006796.

*Primary Examiner* — Yuwen Pan
*Assistant Examiner* — Daniel Christian Paglia
(74) *Attorney, Agent, or Firm* — BRYAN CAVE LEIGHTON PAISNER LLP

(57) ABSTRACT

A disclosure of this specification provides a device configured to operate in a wireless system and to support PC2 (Power Class 2), the device comprising: a transceiver configured with intra-band non-contiguous CA, wherein the transceiver is equipped with dual power amplifier, wherein the intra-band non-contiguous CA is configured to use a first CC(component carrier) and a second CC; and a processor operably connectable to the transceiver, wherein the processor is configured to: determine maximum transmission power, based on an MPR(Maximum Power Reduction), transmit uplink signal using the intra-band non-contiguous CA, based on maximum the transmission power.

7 Claims, 16 Drawing Sheets

(a) Intra-band contiguous CA (b) Intra-band non-contiguous CA

MAXIMUM POWER REDUCTION

CROSS-REFERENCE TO RELATED APPLICATIONS

Pursuant to 35 U.S.C. § 119(e), this application claims the benefit of U.S. Provisional Patent Application No. 63/187,284 filed on May 11, 2021, the contents of which are all hereby incorporated by reference herein in their entirety.

BACKGROUND OF THE DISCLOSURE

Field of the Disclosure

The present disclosure relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In 5G NR, the UE may determine transmission power by applying maximum output power requirements (or requirements). For example, the maximum output power requirement may be a Maximum Power Reduction (MPR) value.

The power class refers to the maximum output for all transmission bandwidths within the channel bandwidth of the NR carrier, and is measured in one subframe (1 ms) period.

It is necessary to define a standard for Power Class 2 UE supporting NR intra-band non-contiguous CA.

SUMMARY OF THE DISCLOSURE

In accordance with an embodiment of the present disclosure, a disclosure of this specification provides a device configured to operate in a wireless system and to support PC2 (Power Class 2), the device comprising: a transceiver configured with intra-band non-contiguous CA, wherein the transceiver is equipped with dual power amplifier, wherein the intra-band non-contiguous CA is configured to use a first CC (component carrier) and a second CC, a processor operably connectable to the transceiver, wherein the processer is configured to: determine maximum transmission power, based on MPR (Maximum Power Reduction), transmit uplink signal using the intra-band non-contiguous CA, based on the maximum transmission power.

The present disclosure can have various advantageous effects.

For example, by performing disclosure of this specification, UE can transmit uplink signal with MPR.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
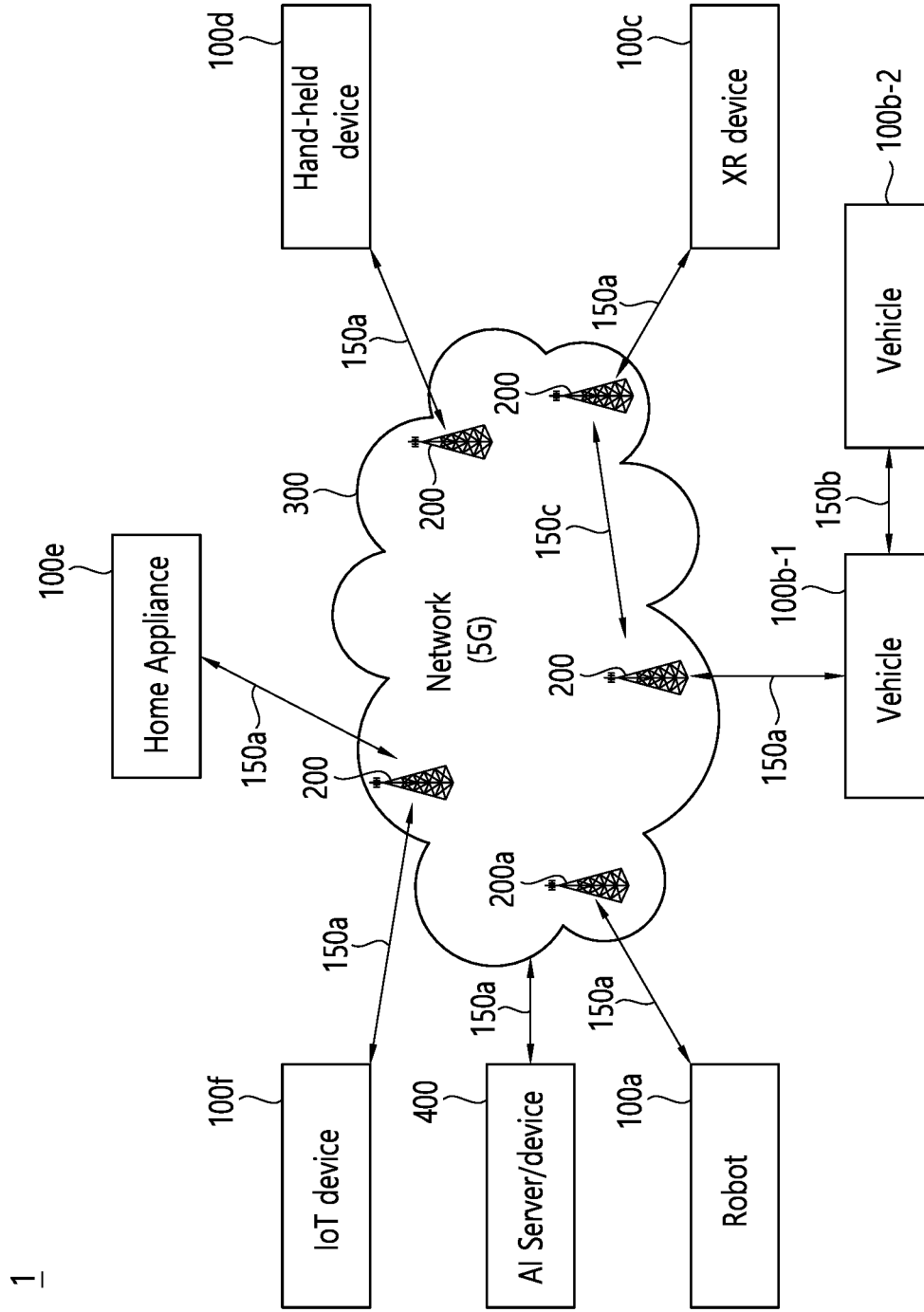
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200 /network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200 . Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200 /the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
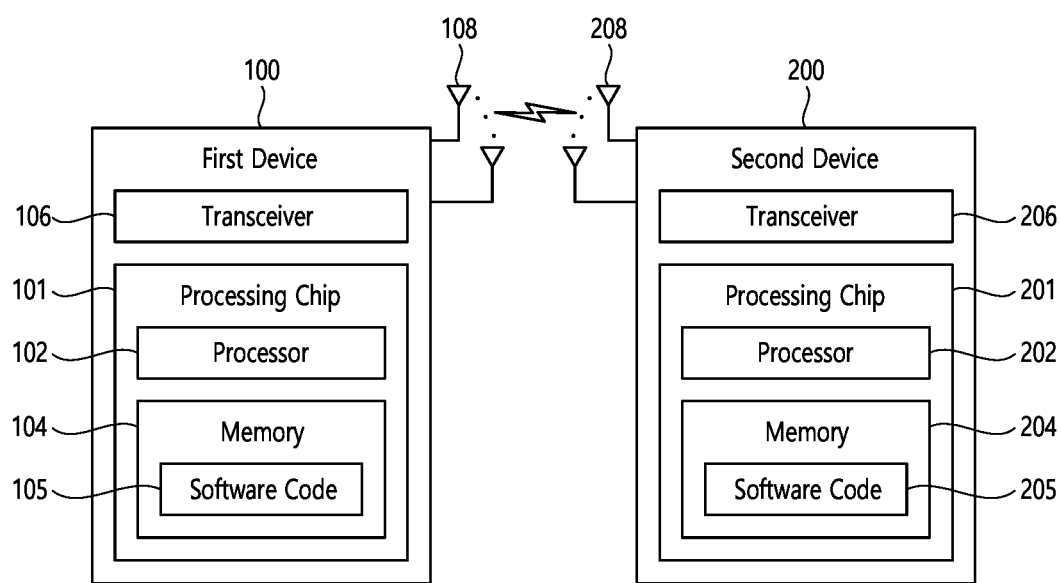
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
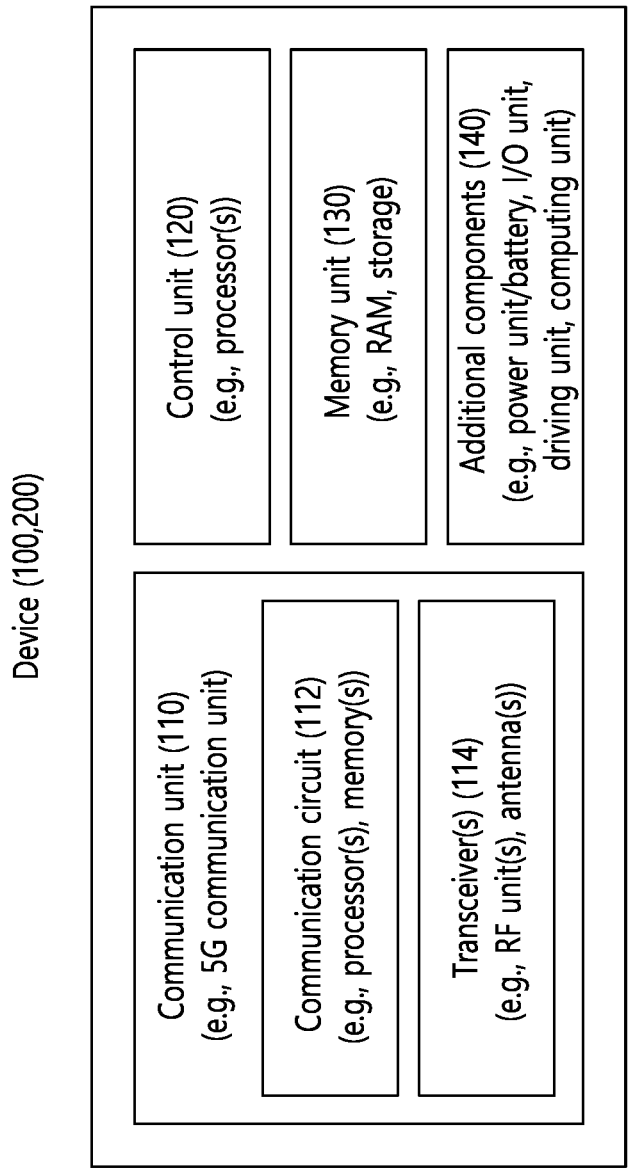
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
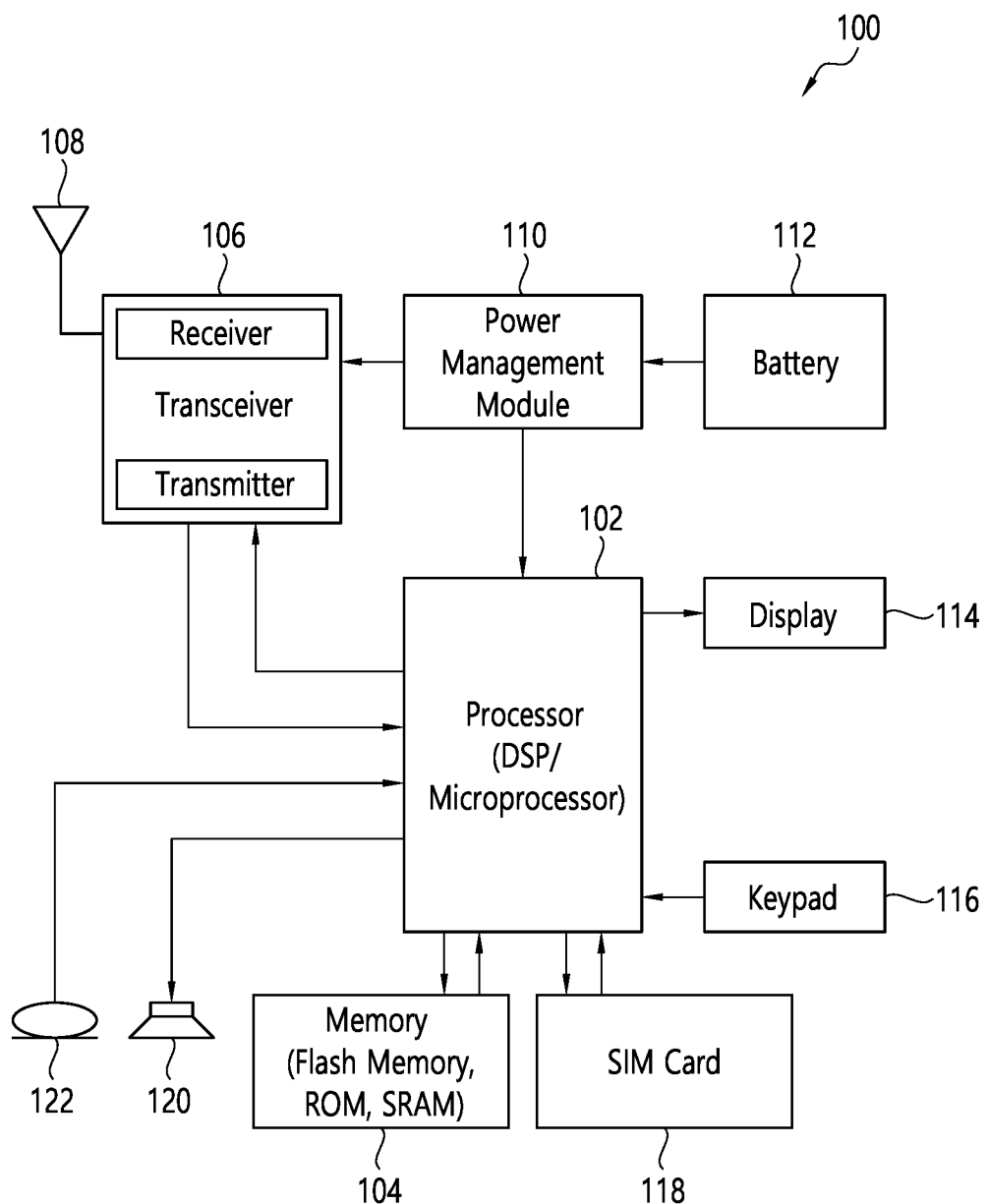
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
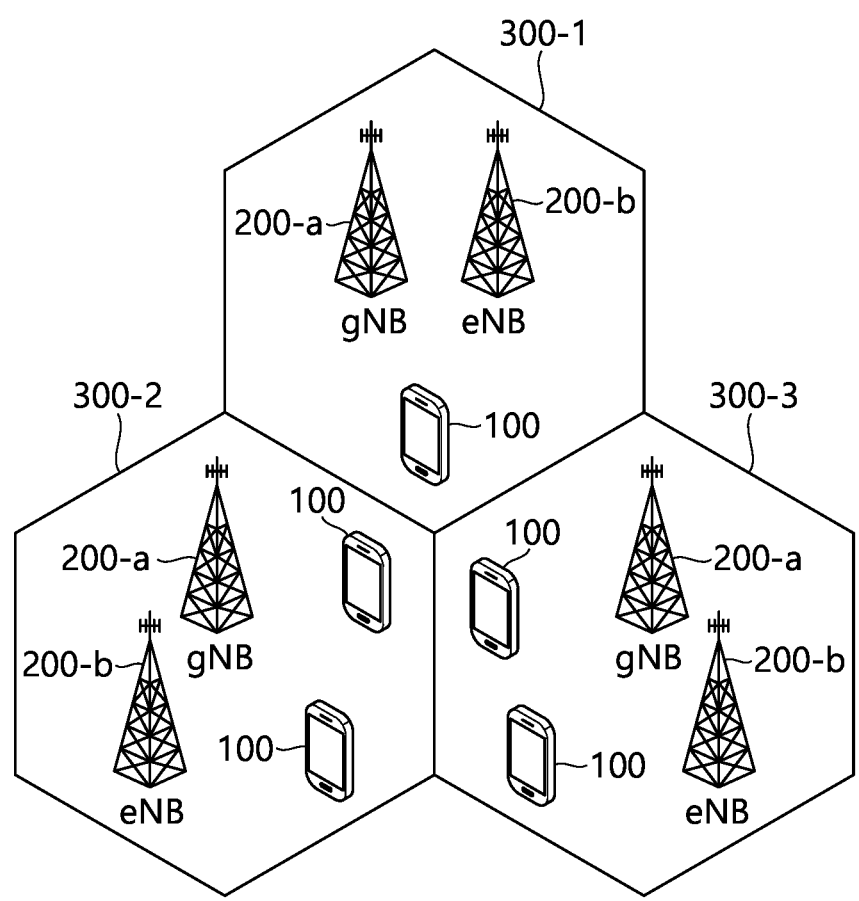
FIG. 5 is an example of a wireless communication system.

FIG. 5 is an example of a wireless communication system.

As can be seen with reference to FIG. 5, a wireless communication system includes at least one base station (BS). The BS is divided into a gNodeB (or gNB) 20*a* and an eNodeB (or an eNB) 20*b*. The gNB 20*a* supports 5G mobile communication. The eNB 20*b* supports 4G mobile communication, that is, long term evolution (LTE).

Each base station 20*a* and 20*b* provides a communication service for a specific geographic area (generally referred to as a cell) (20-1, 20-2, and 20-3). A cell may be again divided into a plurality of regions (referred to as sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<LTE-CA>

Figure 6:
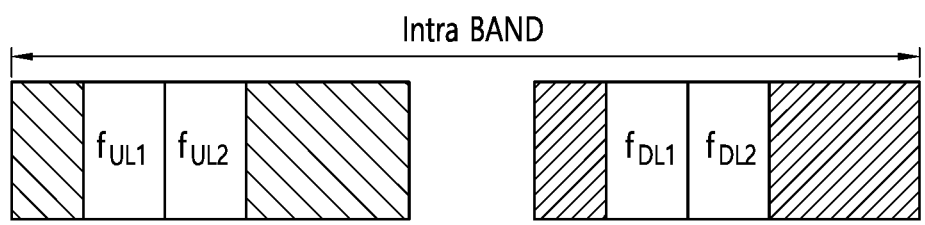
FIG. 6 shows an example of intra-band CA.
Figure 6:
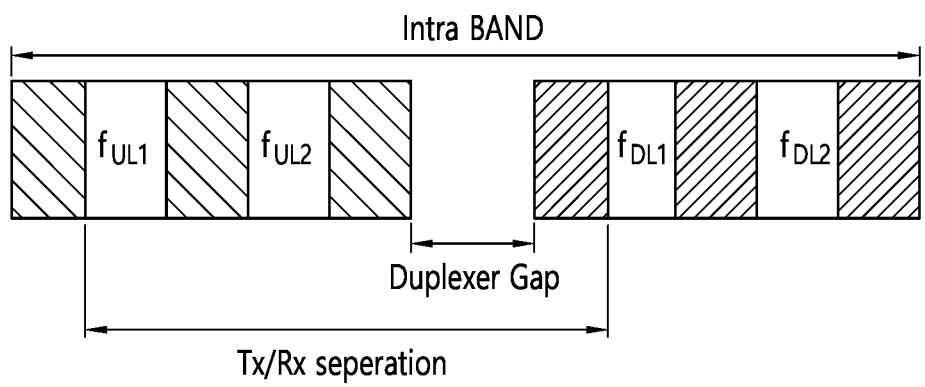

FIG. 6 shows an example of intra-band CA.

Figure 7:
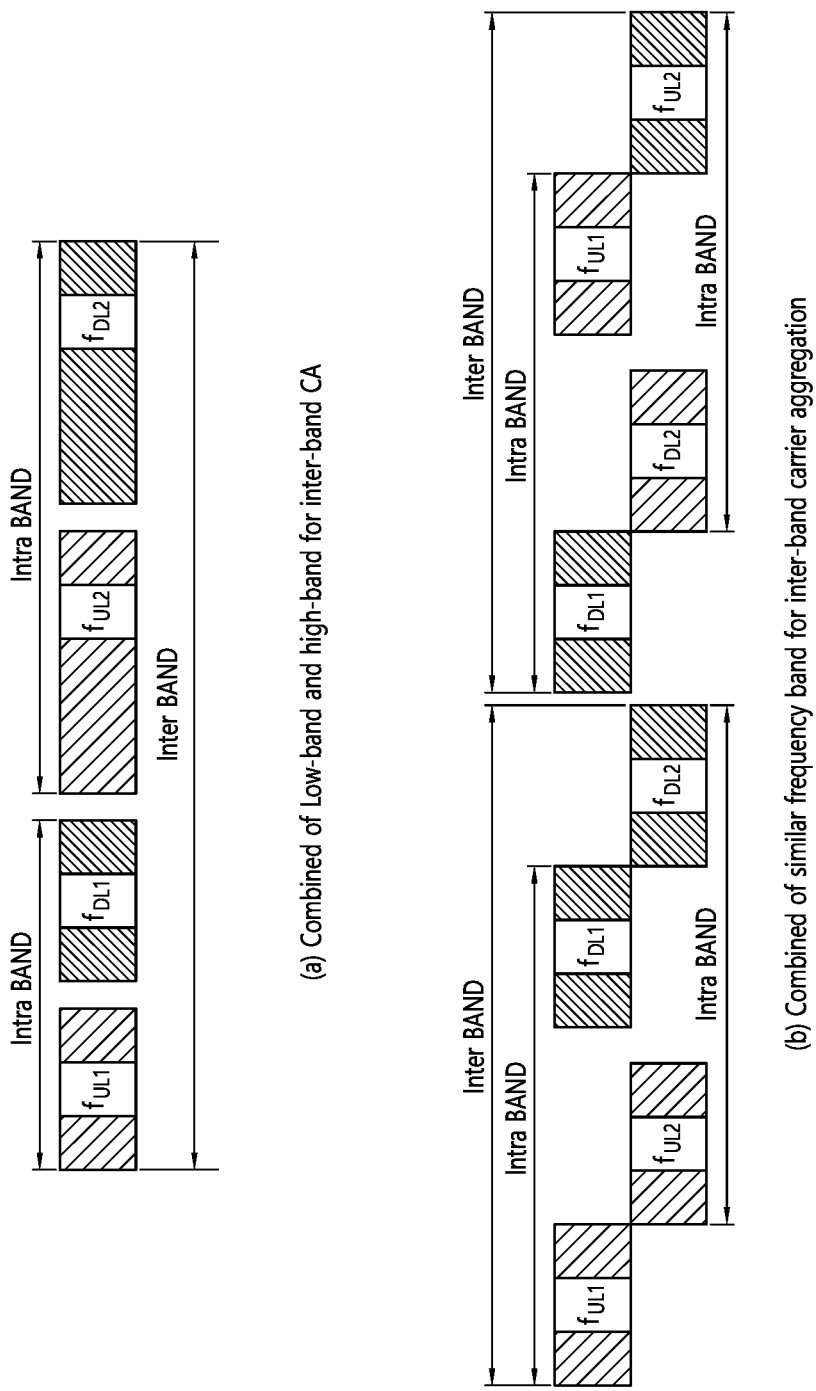
FIG. 7 shows an example of inter-band CA.

FIG. 7 shows an example of inter-band CA.

Carrier aggregation (CA) is a technology for aggregating two or more CC (component carriers), and is a technology introduced in LTE-advanced to support transmission bandwidth up to 100 MHz and spectrum aggregation. To this end, the LTE-Advanced terminal can transmit and receive a plurality of CCs simultaneously according to its capabilities. On the frequency axis, CCs may be arranged continuously or discontinuously. The latter case is called spectrum aggregation, and carrier aggregation is commonly used as a comprehensive meaning of aggregating continuous or discontinuous band signals. The aggregation of discrete spectral fragments is difficult in terms of implementation depending on the location of the spectral fragments and the required total bandwidth.

In the case of LTE-A, various techniques including uplink MIMO and CA (Carrier Aggregation) are added to realize high-speed wireless transmission. The CA discussed in LTE-A is again divided into Intra-Band Contiguous CA and Intra-Band Non-Contiguous CA as shown in FIG. 6, and Inter-Band CA is low-band and high-band with different RF characteristics as shown in FIG. 7. Because inter-band CA and RF characteristics between —band carriers are similar, it is divided into inter-band CA of similar frequency that can use a common RF terminal for each CC.

Figure 8A:
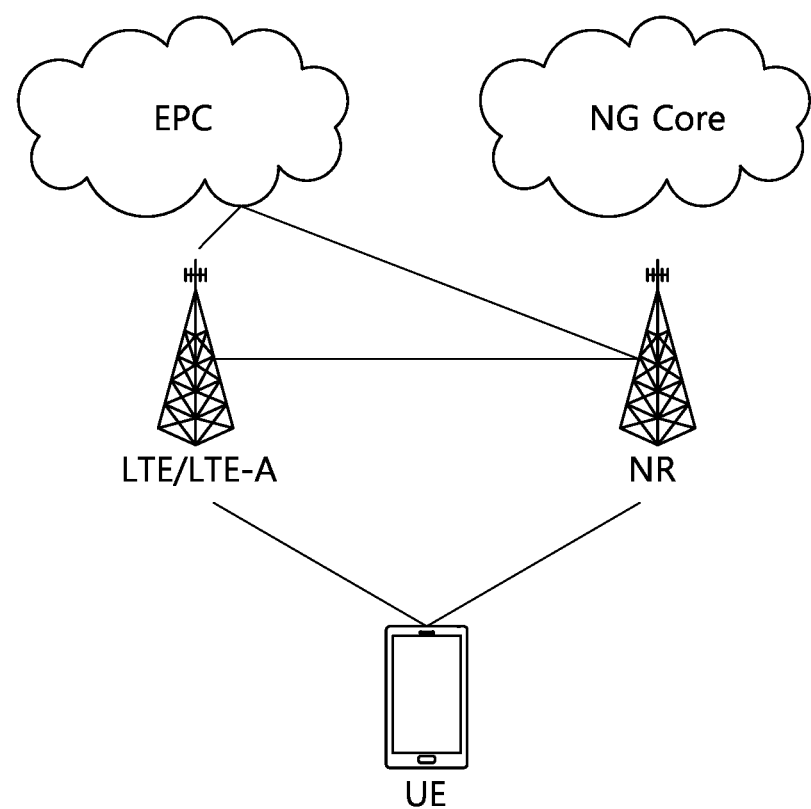
FIGS. 8a to 8c are exemplary diagrams illustrating exemplary architectures for next-generation mobile communication services.
Figure 8B:
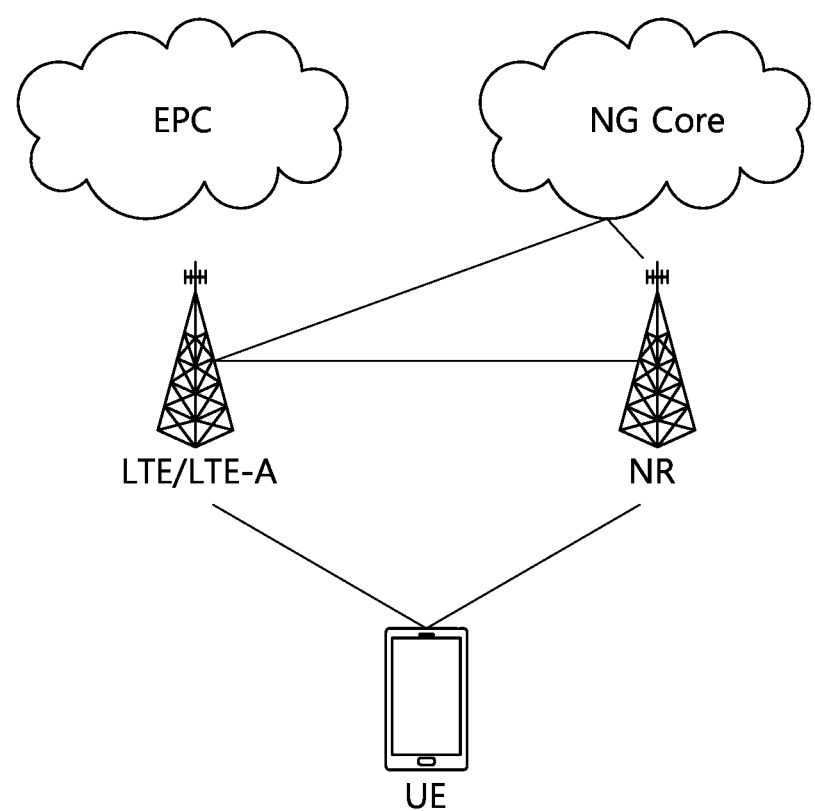
Figure 8C:
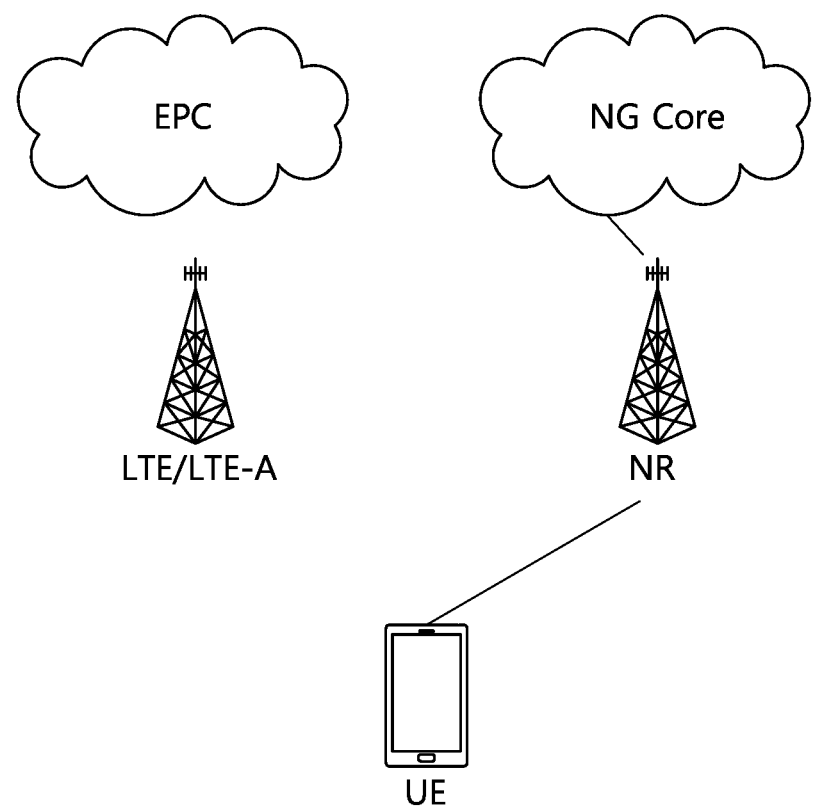

FIGS. 8*a* to 8*c* are exemplary diagrams illustrating exemplary architectures for next-generation mobile communication services.

Referring to FIG. 8*a*, the UE is connected to the LTE/LTE-A-based cell and the NR-based cell in a DC (dual connectivity) manner.

The NR-based cell is connected to a core network for the existing 4G mobile communication, that is, an Evolved Packet Core (EPC).

Referring to FIG. 8*b*, unlike FIG. 8*a*, an LTE/LTE-A-based cell is connected to a core network for 5G mobile communication, that is, a Next Generation (NG) core network.

A service method based on the architecture shown in FIGS. 8*a* and 8*b* is referred to as a non-standalone (NSA).

Referring to FIG. 8*c*, the UE is connected only to an NR-based cell. A service method based on this architecture is called standalone (SA).

Meanwhile, in the NR, it may be considered that reception from a base station uses a downlink subframe, and transmission to a base station uses an uplink subframe. This method can be applied to paired and unpaired spectra. A pair of spectrum means that two carrier spectrums are included for downlink and uplink operation. For example, in a paired spectrum, one carrier may include a downlink band and an uplink band that are paired with each other.

<Operating Band in NR>

The operating bands in NR are as follows.

The operating band of Table 3 below is an operating band converted from the operating band of LTE/LTE-A. This is called the FR1 band.

TABLE 3

| NR operation band | uplink operation band $F_{UL\_low}$-$F_{UL\_high}$ | downlink operation band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |

TABLE 3-continued

| NR operation band | uplink operation band $F_{UL\_low}$-$F_{UL\_high}$ | downlink operation band $F_{DL\_low}$-$F_{DL\_high}$ | Duplex Mode |
|---|---|---|---|
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |
| n99 | 1626.5 MHz-1660.5 MHz | N/A | SUL |

The table below shows the NR operating bands defined on the high frequency phase. This is called the FR2 band.

TABLE 4

| NR operation band | uplink operation band $F_{UL\_low}$-$F_{UL\_high}$ | downlink operation band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 9:
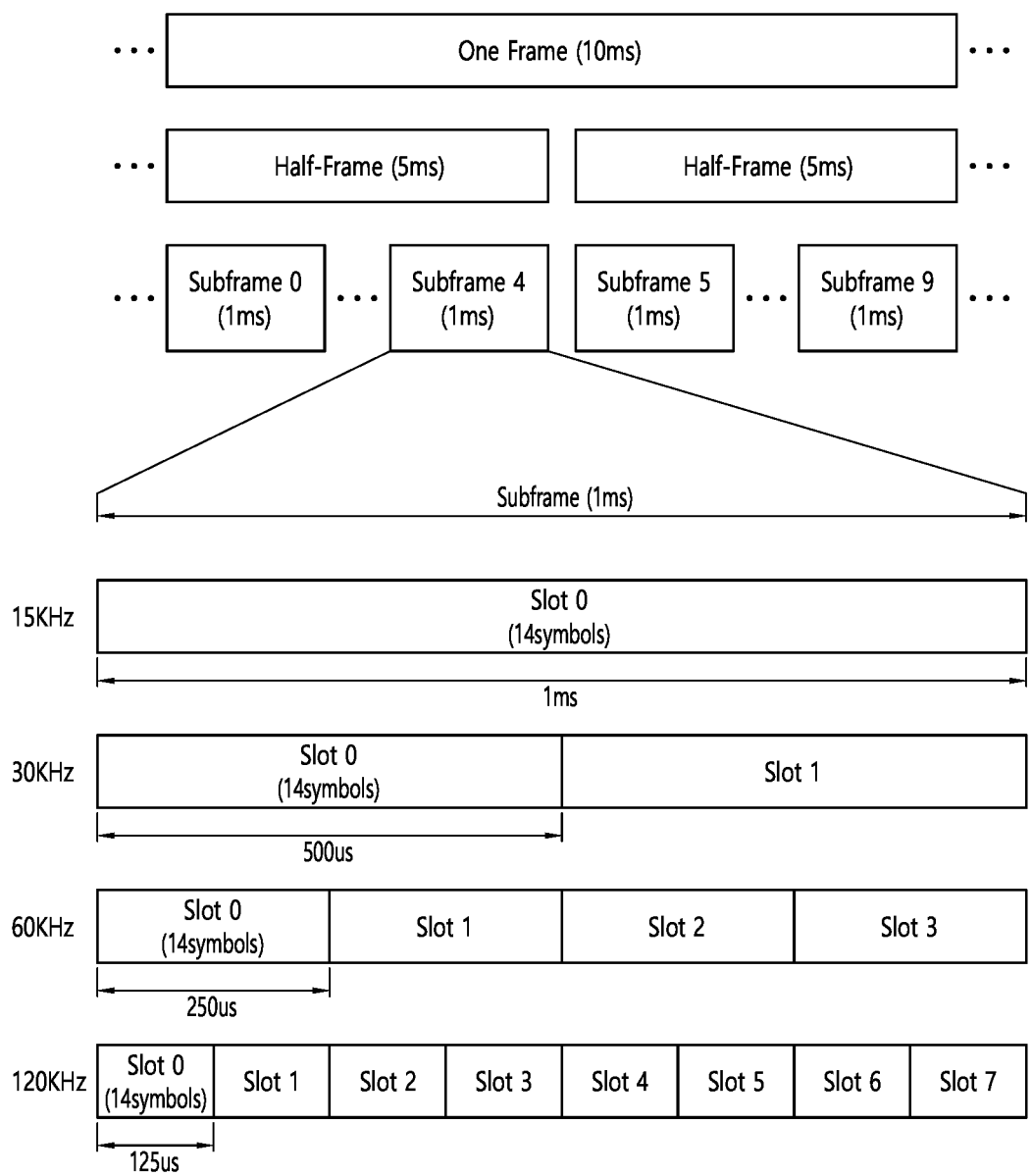
FIG. 9 illustrates a structure of a radio frame used in NR.

FIG. 9 illustrates a structure of a radio frame used in NR.

In NR, uplink and downlink transmission are composed of frames. The radio frame may have a length of 10 ms and may be defined as two 5-ms half-frames (HFs). Each half-frame may be defined as five 1-ms subframes (SFs). A subframe may be divided into one or more slots, and the number of slots in a subframe may depend on SCS (Subcarrier Spacing). Each slot may include 12 or 14 OFDM (A) symbols according to a cyclic prefix (CP). In some implementations, if a CP is used, then each slot contains 14 symbols. If an extended CP is used, then each slot contains 12 symbols. The symbol may include, for example, an OFDM symbol (or a CP-OFDM symbol) and an SC-FDMA symbol (or a DFT-s-OFDM symbol.

Figure 10:
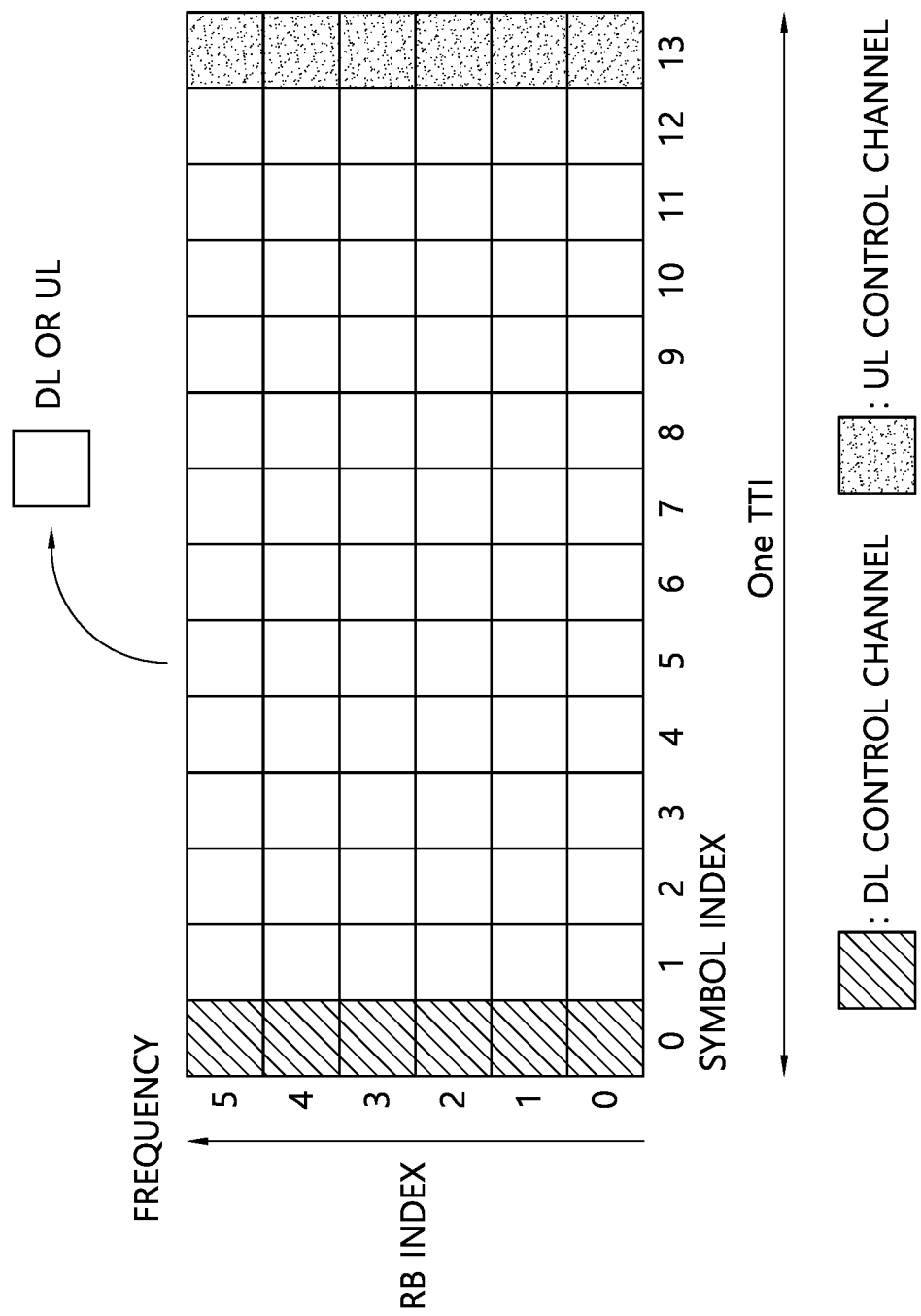
FIG. 10 shows an example of subframe type in NR.

FIG. 10 shows an example of subframe type in NR.

A transmission time interval (TTI) shown in FIG. 10 may be called a subframe or slot for NR (or new RAT). The subframe (or slot) in FIG. 10 may be used in a TDD system of NR (or new RAT) to minimize data transmission delay. As shown in FIG. 10, a subframe (or slot) includes 14 symbols as does the current subframe. A front symbol of the subframe (or slot) can be used for a downlink control channel, and a rear symbol of the subframe (or slot) can be used for a uplink control channel. Other channels can be used for downlink data transmission or uplink data transmission. According to such structure of a subframe (or slot), downlink transmission and uplink transmission may be performed sequentially in one subframe (or slot). Therefore, a downlink data may be received in the subframe (or slot), and an uplink acknowledge response (ACK/NACK) may be transmitted in the subframe (or slot).

A subframe (or slot) in this structure may be called a self-constrained subframe.

Specifically, first N symbols in a slot may be used to transmit a DL control channel (hereinafter, DL control region), and last M symbols in a slot may be used to transmit a UL control channel (hereinafter, UL control region). N and M are each an integer greater than or equal to 0. A resource region (hereinafter, referred to as a data region) between the DL control region and the UL control region can be used for DL data transmission or for UL data transmission. For example, a PDCCH may be transmitted in the DL control region and the PDSCH may be transmitted in the DL data region. A PUCCH may be transmitted in the UL control region, and a PUSCH may be transmitted in the UL data region.

If this structure of a subframe (or slot) is used, it may reduce time required to retransmit data regarding which a reception error occurred, and thus, a final data transmission waiting time may be minimized In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerology>

In a next system, a plurality of numerologies may be provided to a terminal according to the development of wireless communication technology. For example, when SCS is 15 kHz, it supports a wide area in traditional cellular bands, and when SCS is 30 kHz/60 kHz, it supports a dense-urban, lower latency and wider carrier bandwidth, and when SCS is 60 kHz or higher, it supports a bandwidth greater than 24.25 GHz to overcome phase noise.

The numerology may be defined by a cycle prefix (CP) length and a subcarrier spacing (SCS). One cell may provide a plurality of numerologies to the terminal. When an index of numerology is expressed as µ, an interval of each subcarrier and a corresponding CP length may be as shown in the table below.

TABLE 5

| µ | $\Delta f = 2^\mu \cdot 15$ [kHz] | CP |
|---|---|---|
| 0 | 15 | normal |
| 1 | 30 | normal |
| 2 | 60 | normal, extended |
| 3 | 120 | normal |
| 4 | 240 | normal |

In the case of normal CP, when an index of numerology is expressed as µ, the number ($N^{slot}_{symb}$) of OFDM symbols per slot, the number of slots ($N^{frame,\mu}_{slot}$) per frame, and the number ($N^{subframe,\mu}_{slot}$) of slots per subframe are shown in the table below.

TABLE 6

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 6-continued

| $\mu$ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |
| 5 | 14 | 320 | 32 |

In the case of extended CP, when the index of numerology is expressed as $\mu$, the number ($N^{slot}_{symb}$) of OFDM symbols per slot, the number ($N^{frame,\mu}_{slot}$) of slots per frame, and the number ($N^{subframe,\mu}_{slot}$) of slots per subframe are shown in the table below.

TABLE 7

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

<Maximum Output Power>

The UE power class (PC) in Table 8 defines the maximum output power for all transmission bandwidths within the channel bandwidth of the NR carrier unless otherwise specified. The measurement period may be at least one subframe (1 ms).

TABLE 8

| NR band | Class 1 (dBm) | Tolerance (dB) | Class 2 (dBm) | Tolerance (dB) | Class 3 (dBm) | Tolerance (dB) |
|---|---|---|---|---|---|---|
| n1  |    |      |    |      | 23 | ±2 |
| n2  |    |      |    |      | 23 | ±23 |
| n3  |    |      |    |      | 23 | ±23 |
| n5  |    |      |    |      | 23 | ±2 |
| n7  |    |      |    |      | 23 | ±23 |
| n8  |    |      |    |      | 23 | ±23 |
| n12 |    |      |    |      | 23 | ±23 |
| n14 | 31 | +2/−3 |    |      | 23 | ±23 |
| n18 |    |      |    |      | 23 | ±2 |
| n20 |    |      |    |      | 23 | ±23 |
| n25 |    |      |    |      | 23 | ±23 |
| n26 |    |      |    |      | 23 | ±23 |
| n28 |    |      |    |      | 23 | +2/−2.5 |
| n30 |    |      |    |      | 23 | ±2 |
| n34 |    |      |    |      | 23 | ±2 |
| n38 |    |      |    |      | 23 | ±2 |
| n39 |    |      |    |      | 23 | ±2 |
| n40 |    |      |    |      | 23 | ±2 |
| n41 |    |      | 26 | +2/−33 | 23 | ±23 |
| n48 |    |      |    |      | 23 | +2/−3 |
| n50 |    |      |    |      | 23 | ±2 |
| n51 |    |      |    |      | 23 | ±2 |
| n53 |    |      |    |      | 23 | ±2 |
| n65 |    |      |    |      | 23 | ±2 |
| n66 |    |      |    |      | 23 | ±2 |
| n70 |    |      |    |      | 23 | ±2 |
| n71 |    |      |    |      | 23 | +2/−2.5 |
| n74 |    |      |    |      | 23 | ±2 |
| n77 |    |      | 26 | +2/−3 | 23 | +2/−3 |
| n78 |    |      | 26 | +2/−3 | 23 | +2/−3 |
| n79 |    |      | 26 | +2/−3 | 23 | +2/−3 |
| n80 |    |      |    |      | 23 | ±2 |
| n81 |    |      |    |      | 23 | ±2 |
| n82 |    |      |    |      | 23 | ±2 |
| n83 |    |      |    |      | 23 | +2/−2.5 |
| n84 |    |      |    |      | 23 | ±2 |
| n86 |    |      |    |      | 23 | ±2 |
| n89 |    |      |    |      | 23 | ±2 |
| n91 |    |      |    |      | 23 | ±23, 4 |
| n92 |    |      |    |      | 23 | ±23, 4 |
| n93 |    |      |    |      | 23 | ±23, 4 |
| n94 |    |      |    |      | 23 | ±23, 4 |
| n95 |    |      |    |      | 23 | ±2 |

NOTE 1:
Power class is the maximum UE power specified without taking into account tolerances.
NOTE 2:
Unless otherwise specified, Power Class 3 is the default Power Class.
NOTE 3:
Referencing the transmit bandwidth limited within FUL_low and FUL_low + 4 MHz or FUL_high − 4 MHz and FUL_high reduces the lower tolerance limit by 1.5 dB to relax the maximum output power requirement.
NOTE 4:
The maximum output power requirement is relaxed by reducing the lower tolerance limit by 0.3 dB.

The UE supports a different power class from the default power class for the band, and the supported power class enables a higher maximum output power than the default power class, in which case:

if the UE capability maxUplinkDutyCycle-PC2-FR1 field is absent and the proportion of uplink symbols transmitted in a specific evaluation period is greater than 50% (the correct evaluation period is more than one radio frame); or if there is no UE capability maxUplinkDutyCycle-PC2-FR1 field and the ratio of uplink symbols transmitted in a specific evaluation period is greater than the defined maxUplinkDutyCycle-PC2-FR1 (the exact evaluation period is 1 or more radio frames); or if a defined IE P-Max is provided and set to a maximum output power below the default power class All requirements for the base power class shall apply to the supported power class and the transmit power shall be set.

otherwise the defined IE P-Max is not provided or is set to a value higher than the maximum output power of the default power class and the proportion of uplink symbols transmitted in a particular evaluation period is equal to or less than maxUplinkDutyCycle-PC2-FR1. or equal to 50% if no defined IE P-Max is provided or is set to a value higher than the maximum output power of the default power class and the proportion of uplink symbols transmitted in a particular evaluation period or maxUplinkDutyCycle-PC2-FR1 is absent; (exact evaluation period is one or more radio frames):

All requirements for supported power classes shall apply and transmit power shall be set.

<Maximum Power Reduction (MPR) and Allowed Additional MPR (A-MPR)>

Figure 11A:
FIGS. 11a and 11b show an example of a method of limiting transmission power of a terminal.
Figure 11B:
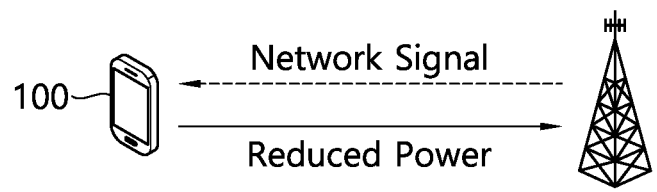

FIGS. 11a and 11b show an example of a method of limiting transmission power of a terminal.

Referring to FIG. 11a, the terminal 100 may perform transmission with limited transmission power. For example, the terminal 100 may perform uplink transmission for the base station through reduced transmission power.

When a peak-to-average power ratio (PAPR) value of a signal transmitted from the terminal 100 increases, in order to limit the transmission power, the terminal 100 applies a maximum output power reduction (MPR) value to the transmission power, thereby reducing linearity of a power amplifier PA inside the transceiver of the terminal 100.

Referring to FIG. 11b, a base station (BS) may request the terminal 100 to apply A-MPR by transmitting a network signal (NS) to the terminal 100. In order not to affect adjacent bands, etc., an operation related to A-MPR may be performed. Unlike the MPR described above, the operation related to the A-MPR is an operation in which the base station transmits NS to the terminal 100 operating in a specific operating band so that the terminal additionally performs power reduction. That is, when the terminal to which MPR is applied receives the NS, the terminal may determine transmission power by additionally applying A-MPR.

<Problems to be Solved in the Disclosure of this Specification>

There has not been a conventional standard for a high-power (26 dBm) terminal supporting NR intra-band non-contiguous CA.

<Disclosure of the Present Specification>

This specification proposes a standard for Power Class 2 terminal supporting NR intra-band non-contiguous CA.

For reference, as an example of a wireless communication device capable of performing wireless communication hereinafter, terms such as "terminal" and "UE" may be used. For reference, the MPR value described in the disclosure of this specification may be an example of a maximum output power requirement.

RF architecture and MPR assumptions for intra-band UL NC CA can be summarized as follows.

TABLE 9

| Architecture | Description | MPR evaluation assumption |
|---|---|---|
| #1 | 2 × 26 dBm PA + 2LO with 100 MHz BW | PA calibration for 20 MHz QPSK DFT-s-OFDM 100RB0 waveform based on 4 dB post PA losses and 1 dB MPR: |
| #2 | 1 × 26 dBm PA + 1LO with 200 MHz BW | 26 dBm/antenna: 29 dBm at 31 dB ACLR 23 dBm/antenna: 26 dBm at 30 dB ACLR Equal PSD and Equal back-off power split |
| #3 | 2 × 23 dBm PA + 1LO with 200 MHz BW | For 2PA architecture, 10 dB antenna isolation is assumed |
| #4 | 1 × 23 dBm + 1 × 26 dBm + 2LO with 100 MHz BW | For 2PA architecture, Emission requirements are checked by summing the power of the two transmit paths Waveform: both CP-OFDM and DFT-s-OFDM can be evaluated CBW configuration: 20 MHz channel 15 kHz SCS and 40 MHz channel 15 kHz SCS with a gap of 20 MHz (100 MHz class and in gap ACLR) 40 MHz channel 15 kHz SCS and 40 MHz channel 15 kHz SCS with a gap of 120 MHz (200 MHz class) 100 MHz channel 30 kHz SCS and 100 MHz channel 30 kHz SCS with a gap of 400 MHz (600 MHz class for n77(2A)) RB allocation: Worst case back-off IMD3 at −13 dBm/MHz and −30 dBm/MHz for 1RB + 1RB at 15 kHz and 30 kHz SCS for MPR with 31 dBc ACLR The RB locations adopt for MPR evaluation in [2][8][9] can be referenced. |

More MPR values to determine the net power gain of PC2 compared to PC3 may be provided.

If some architecture is beneficial in supporting UL MIMO, the same or different set of requirements may be considered.

It may be further checked if in-gap exceptions (for both PC3 and PC2) required by some architectures are allowed by regulations.

For the PA (power amplifier) swap time for 1*23 dBm+ 1*26 dBm+2LO (Local Oscillator) with −100 MHz BW, the following options may be available.

Option 1: Define a new swap time specifically for this architecture.
Option 2: Swap time is 0us.
Option 3: 0us or 35 us or 140 us
For a 1×26 dBm PA+1LO with 200 MHz BW and a 2*23 dBm PA+1LO with 200 MHz BW, how to handle the in-gap requirement when the LO or image fall inside may have the following options:
Option 1: Reuse in-gap exception under some conditions (e.g. Sync) as defined for PC3
Option 2: use MPR to meet in-gap emission requirement
Option 3: other Based on architecture #4, it is recommended to provide analysis on PA swap time UE can reach, and the impact of the swap time is evaluated on the remaining benefit versus PC3 for the different proposed swap time for PC2 intra-band UL NC CA.

In-gap requirements may be further checked based on architectures #2 and #3, RAN4.

Initial MPR simulations results and expected swap time for PC2 intra-band UL non-contiguous CA UE may be provided.

The UE architecture perspective, the #4 RF architecture with 1*23 dBm+1*26 dBm PAs can support UL non-contiguous CA with the separate class III as shown in Table 10.

Table 10 shows NR intra-band non-contiguous UL CA frequency separation classes.

TABLE 10

| NR NC UL CA frequency separation class | Maximum allowed frequency separation |
|---|---|
| I | 100 MHz |
| II | 200 MHz |
| III | [600 MHz] |

The #4 architecture may also support UL-MIMO in single carrier compare to architecture #2 and #3. Furthermore, the required MPR level may be less than 2×23 dBm PA architecture based on our simulation results. The MPR results for 26 dBm PA is quite optimistic, RAN4 need to consider low cost UE to derive the MPR for PC2 intra-band CA UE. So, the common 26 dBm PA may be baseline to derive MPR requirements for PC2 intra-band NC-CA UE.

The #4 RF architecture with 1×23 dBm+1×26 dBm PAs may support UL non-contiguous CA with the separate class III. Also support UL-MIMO in single carrier may compare to architecture #2 and #3.

1. MPR Results for #4 (1*23 dBm+1*26 dBm) PA Architecture

Firstly, the required MPR results for intra-band NR non-contiguous RB allocation for 2PA #4 RF architecture (23 dBm+26 dBm with 2LOs) may be measured.

Tables 11 and 12 show the MPR results required for intra-band NR non-contiguous RB allocation for the 2PA #4 RF architecture (23 dBm+26 dBm in 2LO).

Table 11 shows measured MPR results (23 dBm+26 dBm, 2LOs) with −30 dBm/MHz based on waveforms, modulation order and RB allocations.

Table 12 shows measured MPR results (23 dBm+26 dBm, 2LOs) with −13 dBm/MHz based on waveforms, modulation order and RB allocations.

TABLE 11

| NR CC1 20 MHz | | NR CC2 40 MHz | | DFT-S-OFDM MPR | CP-OFDM MPR | B (allocated RB portion in all aggregated CBW) |
|---|---|---|---|---|---|---|
| SCS | Allocated RB | SCS | allocated RB | | | |
| 15 KHz | 001R000 | 15 KHz | 001R215 | 15.5 | 15.5 | 0.36 |
| 15 KHz | 002R104 | 15 KHz | 001R000 | 15.0 | 15.0 | 0.54 |
| 15 KHz | 005R000 | 15 KHz | 001R215 | 13.8 | 14.3 | 1.08 |
| 15 KHz | 008R000 | 15 KHz | 002R214 | 12.7 | 13.8 | 1.80 |
| 15 KHz | 008R000 | 15 KHz | 003R213 | 12.5 | 13.8 | 1.98 |
| 15 KHz | 010R000 | 15 KHz | 003R213 | 12.3 | 13.3 | 2.34 |
| 15 KHz | 008R000 | 15 KHz | 007R209 | 12.3 | 13.1 | 2.70 |
| 15 KHz | 015R091 | 15 KHz | 001R215 | 12.0 | 13.0 | 2.88 |
| 15 KHz | 015R091 | 15 KHz | 004R000 | 11.6 | 12.2 | 3.42 |
| 15 KHz | 015R091 | 15 KHz | 006R000 | 10.2 | 10.6 | 3.78 |
| 15 KHz | 015R091 | 15 KHz | 010R000 | 10.0 | 10.3 | 4.50 |
| 15 KHz | 015R000 | 15 KHz | 015R000 | 9.5 | 10.0 | 5.40 |
| 15 KHz | 030R076 | 15 KHz | 002R000 | 8.6 | 9.0 | 5.76 |
| 15 KHz | 020R000 | 15 KHz | 020R196 | 8.6 | 8.8 | 7.20 |
| 15 KHz | 053R000 | 15 KHz | 001R215 | 5.5 | 6.0 | 9.72 |
| 15 KHz | 045R061 | 15 KHz | 020R000 | 5.0 | 5.0 | 11.70 |
| 15 KHz | 060R046 | 15 KHz | 020R000 | 4.6 | 4.7 | 14.40 |
| 15 KHz | 090R016 | 15 KHz | 030R000 | 5.2 | 5.5 | 21.60 |
| 15 KHz | 106R000 | 15 KHz | 050R000 | 5.5 | 5.9 | 28.08 |
| 15 KHz | 053R000 | 15 KHz | 108R000 | 5.3 | 5.7 | 28.98 |
| 15 kHz | 106R000 | 15 kHz | 150R000 | 6.0 | 6.5 | 46.08 |
| 15 KHz | 106R000 | 15 KHz | 216R000 | 5.5 | 5.7 | 57.96 |

| NR CC1 40 MHz | | NR CC2 40 MHz | | DFT-S-OFDM MPR | CP-OFDM MPR | B (allocated RB portion in all aggregated CBW) |
|---|---|---|---|---|---|---|
| SCS | Allocated RB | SCS | Allocated RB | | | |
| 15 KHz | 001R000 | 15 KHz | 001R215 | 15.5 | 15.5 | 0.36 |
| 15 KHz | 001R000 | 15 KHz | 001R000 | 15.0 | 15.2 | 0.36 |
| 15 KHz | 002R214 | 15 KHz | 001R000 | 14.2 | 14.7 | 0.54 |
| 15 KHz | 005R000 | 15 KHz | 001R215 | 14.0 | 14.5 | 1.08 |
| 15 KHz | 008R000 | 15 KHz | 002R214 | 13.5 | 13.8 | 1.80 |
| 15 KHz | 008R000 | 15 KHz | 003R213 | 13.0 | 13.0 | 1.98 |
| 15 KHz | 010R000 | 15 KHz | 003R213 | 12.4 | 12.6 | 2.34 |
| 15 KHz | 015R201 | 15 KHz | 001R000 | 11.9 | 11.9 | 2.88 |
| 15 KHz | 015R201 | 15 KHz | 004R000 | 11.5 | 11.8 | 3.42 |
| 15 KHz | 015R201 | 15 KHz | 006R000 | 11.2 | 11.2 | 3.78 |
| 15 KHz | 015R201 | 15 KHz | 010R000 | 10.7 | 10.8 | 4.50 |
| 15 KHz | 015R000 | 15 KHz | 015R000 | 10.0 | 10.0 | 5.40 |
| 15 KHz | 030R186 | 15 KHz | 002R000 | 8.8 | 9.0 | 5.76 |
| 15 KHz | 020R000 | 15 KHz | 020R196 | 8.8 | 8.8 | 7.20 |
| 15 KHz | 030R000 | 15 KHz | 024R192 | 7.8 | 8.0 | 9.72 |
| 15 KHz | 045R171 | 15 KHz | 020R000 | 5.5 | 5.8 | 11.70 |
| 15 KHz | 070R146 | 15 KHz | 030R000 | 4.5 | 4.5 | 18.00 |
| 15 KHz | 108R000 | 15 KHz | 001R000 | 4.4 | 4.5 | 19.62 |
| 15 KHz | 108R000 | 15 KHz | 108R000 | 4.0 | 4.0 | 38.88 |
| 15 KHz | 150R066 | 15 KHz | 070R000 | 3.0 | 3.3 | 39.60 |
| 15 KHz | 150R000 | 15 KHz | 150R066 | 3.0 | 3.0 | 54.00 |
| 15 kHz | 216R000 | 15 kHz | 216R000 | 3.0 | 3.0 | 77.76 |

TABLE 11-continued

| NR CC1 100 MHz | | NR CC2 100 MHz | | DFT-S-OFDM MPR | CP-OFDM MPR | B (allocated RB portion in all aggregated CBW) |
|---|---|---|---|---|---|---|
| SCS | Allocated RB | SCS | Allocated RB | | | |
| 30 KHz | 001R000 | 30 KHz | 001R272 | 15.5 | 15.5 | 0.72 |
| 30 KHz | 001R000 | 30 KHz | 001R000 | 15.2 | 15.3 | 0.72 |
| 30 KHz | 002R271 | 30 KHz | 001R000 | 14.3 | 14.7 | 1.08 |
| 30 KHz | 005R000 | 30 KHz | 002R271 | 13.2 | 13.4 | 2.52 |
| 30 KHz | 008R000 | 30 KHz | 003R270 | 12.0 | 12.0 | 3.96 |
| 30 KHz | 010R000 | 30 KHz | 003R270 | 10.5 | 10.8 | 4.68 |
| 30 KHz | 015R258 | 30 KHz | 001R000 | 9.7 | 10.0 | 5.76 |
| 30 KHz | 015R258 | 30 KHz | 004R000 | 9.0 | 9.0 | 6.84 |
| 30 KHz | 015R258 | 30 KHz | 006R000 | 8.7 | 8.7 | 7.56 |
| 30 KHz | 015R258 | 30 KHz | 010R000 | 7.4 | 7.5 | 9.00 |
| 30 KHz | 015R258 | 30 KHz | 013R000 | 6.0 | 6.4 | 10.08 |
| 30 KHz | 015R000 | 30 KHz | 015R000 | 5.8 | 6.0 | 10.80 |
| 30 KHz | 030R243 | 30 KHz | 002R000 | 5.5 | 5.5 | 11.52 |
| 30 KHz | 020R253 | 30 KHz | 015R000 | 5.3 | 5.4 | 12.60 |
| 30 KHz | 030R243 | 30 KHz | 008R000 | 5.3 | 5.3 | 13.68 |
| 30 KHz | 020R000 | 30 KHz | 020R253 | 4.8 | 5.0 | 14.40 |
| 30 KHz | 045R228 | 30 KHz | 020R000 | 4.1 | 4.2 | 23.40 |
| 30 KHz | 100R173 | 30 KHz | 030R000 | 3.0 | 3.0 | 46.80 |
| 30 KHz | 136R000 | 30 KHz | 001R000 | 5.2 | 5.2 | 49.32 |
| 30 KHz | 160R113 | 30 KHz | 050R000 | 2.5 | 2.5 | 75.60 |
| 30 KHz | 136R000 | 30 KHz | 136R000 | 3.4 | 3.7 | 97.92 |
| 30 KHz | 220R053 | 30 KHz | 100R000 | 2.5 | 2.5 | 115.20 |
| 30 KHz | 250R023 | 30 KHz | 150R000 | 2.5 | 2.5 | 144.00 |
| 30 KHz | 273R000 | 30 KHz | 273R000 | 2.5 | 2.5 | 196.56 |

TABLE 12

| NR CC1 20 MHz | | NR CC2 40 MHz | | DFT-S-OFDM MPR | CP-OFDM MPR | B (allocated RB portion in all aggregated CBW) |
|---|---|---|---|---|---|---|
| SCS | Allocated RB | SCS | allocated RB | | | |
| 15 KHz | 001R000 | 15 KHz | 001R000 | 8.0 | 8.5 | 0.36 |
| 15 KHz | 002R104 | 15 KHz | 001R000 | 8.0 | 8.2 | 0.54 |
| 15 KHz | 005R000 | 15 KHz | 001R215 | 7.4 | 7.5 | 1.08 |
| 15 KHz | 008R098 | 15 KHz | 002R214 | 5.0 | 5.0 | 1.80 |
| 15 KHz | 008R098 | 15 KHz | 003R213 | 4.8 | 4.9 | 1.98 |
| 15 KHz | 010R096 | 15 KHz | 003R213 | 4.4 | 4.6 | 2.34 |
| 15 KHz | 008R000 | 15 KHz | 007R209 | 4.4 | 4.5 | 2.70 |
| 15 KHz | 015R091 | 15 KHz | 001R215 | 4.2 | 4.4 | 2.88 |
| 15 KHz | 015R091 | 15 KHz | 004R000 | 6.1 | 6.2 | 3.42 |
| 15 KHz | 015R091 | 15 KHz | 006R000 | 5.0 | 5.3 | 3.78 |
| 15 KHz | 015R091 | 15 KHz | 010R000 | 4.4 | 4.5 | 4.50 |
| 15 KHz | 015R000 | 15 KHz | 015R000 | 4.2 | 4.3 | 5.40 |
| 15 KHz | 030R076 | 15 KHz | 002R000 | 6.2 | 6.5 | 5.76 |
| 15 KHz | 020R000 | 15 KHz | 020R196 | 4.4 | 4.4 | 7.20 |
| 15 KHz | 053R000 | 15 KHz | 001R215 | 4.0 | 4.0 | 9.72 |
| 15 KHz | 045R061 | 15 KHz | 020R000 | 4.0 | 4.2 | 11.70 |
| 15 KHz | 060R046 | 15 KHz | 020R000 | 4.0 | 4.1 | 14.40 |
| 15 KHz | 090R016 | 15 KHz | 030R000 | 4.0 | 4.2 | 21.60 |
| 15 KHz | 106R000 | 15 KHz | 050R000 | 4.0 | 4.0 | 28.08 |
| 15 KHz | 053R000 | 15 KHz | 108R000 | 4.3 | 4.5 | 28.98 |
| 15 kHz | 106R000 | 15 kHz | 150R000 | 4.3 | 4.5 | 46.08 |
| 15 KHz | 106R000 | 15 KHz | 216R000 | 4.2 | 4.2 | 57.96 |

| NR CC1 40 MHz | | NR CC2 40 MHz | | DFT-S-OFDM MPR | CP-OFDM MPR | B (allocated RB portion in all aggregated CBW) |
|---|---|---|---|---|---|---|
| SCS | Allocated RB | SCS | Allocated RB | | | |
| 15 KHz | 001R215 | 15 KHz | 001R000 | 6.3 | 6.5 | 0.36 |
| 15 KHz | 001R000 | 15 KHz | 001R000 | 5.5 | 5.8 | 0.36 |
| 15 KHz | 002R214 | 15 KHz | 001R000 | 5.3 | 5.5 | 0.54 |

TABLE 12-continued

| NR CC1 | | NR CC2 | | | | B (allocated RB portion in all |
|---|---|---|---|---|---|---|
| SCS | Allocated RB | SCS | Allocated RB | DFT-S-OFDM MPR | CP-OFDM MPR | aggregated CBW) |
| 15 KHz | 005R000 | 15 KHz | 001R215 | 5.2 | 5.5 | 1.08 |
| 15 KHz | 008R000 | 15 KHz | 002R214 | 5.0 | 5.2 | 1.80 |
| 15 KHz | 008R000 | 15 KHz | 003R213 | 4.5 | 4.8 | 1.98 |
| 15 KHz | 010R000 | 15 KHz | 003R213 | 4.5 | 4.8 | 2.34 |
| 15 KHz | 015R201 | 15 KHz | 001R000 | 4.3 | 4.5 | 2.88 |
| 15 KHz | 015R201 | 15 KHz | 004R000 | 4.2 | 4.3 | 3.42 |
| 15 KHz | 015R201 | 15 KHz | 006R000 | 3.8 | 4.0 | 3.78 |
| 15 KHz | 015R201 | 15 KHz | 010R000 | 3.8 | 4.1 | 4.50 |
| 15 KHz | 015R000 | 15 KHz | 015R000 | 4.0 | 4.5 | 5.40 |
| 15 KHz | 030R186 | 15 KHz | 002R000 | 3.7 | 3.8 | 5.76 |
| 15 KHz | 020R000 | 15 KHz | 020R196 | 3.6 | 3.8 | 7.20 |
| 15 KHz | 030R000 | 15 KHz | 024R192 | 3.6 | 3.6 | 9.72 |
| 15 KHz | 045R171 | 15 KHz | 020R000 | 2.5 | 2.8 | 11.70 |
| 15 KHz | 070R146 | 15 KHz | 030R000 | 2.6 | 2.7 | 18.00 |
| 15 KHz | 108R000 | 15 KHz | 001R000 | 2.6 | 3.0 | 19.62 |
| 15 KHz | 108R000 | 15 KHz | 108R000 | 2.8 | 3.0 | 38.88 |
| 15 KHz | 150R066 | 15 KHz | 070R000 | 2.6 | 2.7 | 39.60 |
| 15 KHz | 150R000 | 15 KHz | 150R066 | 2.3 | 2.5 | 54.00 |
| 15 kHz | 216R000 | 15 kHz | 216R000 | 2.3 | 2.5 | 77.76 |

| NR CC1 100 MHz | | NR CC2 100 MHz | | | | B (allocated RB portion in all |
|---|---|---|---|---|---|---|
| SCS | Allocated RB | SCS | Allocated RB | DFT-S-OFDM MPR | CP-OFDM MPR | aggregated CBW) |
| 30 KHz | 001R000 | 30 KHz | 001R272 | 6.4 | 6.7 | 0.72 |
| 30 KHz | 001R000 | 30 KHz | 001R000 | 6.0 | 6.0 | 0.72 |
| 30 KHz | 002R271 | 30 KHz | 001R000 | 5.7 | 5.8 | 1.08 |
| 30 KHz | 005R000 | 30 KHz | 002R271 | 5.5 | 5.5 | 2.52 |
| 30 KHz | 008R000 | 30 KHz | 003R270 | 5.3 | 5.4 | 3.96 |
| 30 KHz | 010R000 | 30 KHz | 003R270 | 5.0 | 5.2 | 4.68 |
| 30 KHz | 015R258 | 30 KHz | 001R000 | 5.0 | 5.0 | 5.76 |
| 30 KHz | 015R258 | 30 KHz | 004R000 | 3.8 | 4.0 | 6.84 |
| 30 KHz | 015R258 | 30 KHz | 006R000 | 3.8 | 4.0 | 7.56 |
| 30 KHz | 015R258 | 30 KHz | 010R000 | 3.5 | 3.5 | 9.00 |
| 30 KHz | 015R258 | 30 KHz | 013R000 | 3.3 | 3.5 | 10.08 |
| 30 KHz | 015R000 | 30 KHz | 015R000 | 3.3 | 3.3 | 10.80 |
| 30 KHz | 030R243 | 30 KHz | 002R000 | 4.0 | 4.0 | 11.52 |
| 30 KHz | 020R253 | 30 KHz | 015R000 | 3.2 | 3.3 | 12.60 |
| 30 KHz | 030R243 | 30 KHz | 008R000 | 2.8 | 2.8 | 13.68 |
| 30 KHz | 020R000 | 30 KHz | 020R253 | 2.7 | 2.8 | 14.40 |
| 30 KHz | 045R228 | 30 KHz | 020R000 | 2.9 | 2.9 | 23.40 |
| 30 KHz | 100R173 | 30 KHz | 030R000 | 2.8 | 2.7 | 46.80 |
| 30 KHz | 136R000 | 30 KHz | 001R000 | 2.8 | 2.9 | 49.32 |
| 30 KHz | 160R113 | 30 KHz | 050R000 | 2.0 | 2.0 | 75.60 |
| 30 KHz | 136R000 | 30 KHz | 136R000 | 2.3 | 2.5 | 97.92 |
| 30 KHz | 220R053 | 30 KHz | 100R000 | 1.7 | 1.7 | 115.20 |
| 30 KHz | 250R023 | 30 KHz | 150R000 | 1.7 | 1.7 | 144.00 |
| 30 KHz | 273R000 | 30 KHz | 273R000 | 1.7 | 1.7 | 196.56 |

2. MPR Results for #1 (2*26 dBm) PA Architecture

Secondly, the required MPR results intra-band NR non-contiguous RB allocation for 2PA #1 RF architecture (26 dBm+26 dBm with 2LOs) may be measured.

Tables 13 and 14 show the MPR results required for intra-band NR non-contiguous RB allocation for the 2PA #1 RF architecture (26 dBm+26 dBm, 2LOs).

Table 13 shows measured MPR results (2×26 dBm, 2LO) with −30 dBm/MHz based on waveforms, modulation order and RB allocations.

Table 14 shows measured MPR results (26 dBm+26 dBm, 2LOs) with −13 dBm/MHz based on waveforms, modulation order and RB allocations.

TABLE 13

| NR CC1 20 MHz | | NR CC2 40 MHz | | | | B (allocated RB portion in all |
|---|---|---|---|---|---|---|
| SCS | Allocated RB | SCS | allocated RB | DFT-S-OFDM MPR | CP-OFDM MPR | aggregated CBW) |
| 15 KHz | 001R000 | 15 KHz | 001R215 | 14.4 | 14.4 | 0.36 |
| 15 KHz | 002R104 | 15 KHz | 001R000 | 14.0 | 14.2 | 0.54 |
| 15 KHz | 005R000 | 15 KHz | 001R215 | 12.9 | 13.0 | 1.08 |
| 15 KHz | 008R000 | 15 KHz | 002R214 | 12.3 | 12.5 | 1.80 |
| 15 KHz | 008R000 | 15 KHz | 003R213 | 12.3 | 12.4 | 1.98 |

TABLE 13-continued

| SCS | Allocated RB | SCS | Allocated RB | DFT-S-OFDM MPR | CP-OFDM MPR | B (allocated RB portion in all aggregated CBW) |
|---|---|---|---|---|---|---|
| 15 KHz | 010R000 | 15 KHz | 003R213 | 12.0 | 12.0 | 2.34 |
| 15 KHz | 008R000 | 15 KHz | 007R209 | 11.5 | 11.8 | 2.70 |
| 15 KHz | 015R091 | 15 KHz | 001R215 | 11.1 | 11.3 | 2.88 |
| 15 KHz | 015R091 | 15 KHz | 004R000 | 10.4 | 10.7 | 3.42 |
| 15 KHz | 015R091 | 15 KHz | 006R000 | 10.1 | 10.3 | 3.78 |
| 15 KHz | 015R091 | 15 KHz | 010R000 | 10.0 | 10.0 | 4.50 |
| 15 KHz | 015R000 | 15 KHz | 015R000 | 9.1 | 9.4 | 5.40 |
| 15 KHz | 030R076 | 15 KHz | 002R000 | 8.5 | 8.5 | 5.76 |
| 15 KHz | 020R000 | 15 KHz | 020R196 | 8.8 | 8.8 | 7.20 |
| 15 KHz | 053R000 | 15 KHz | 001R215 | 5.3 | 5.5 | 9.72 |
| 15 KHz | 045R061 | 15 KHz | 020R000 | 5.0 | 5.0 | 11.70 |
| 15 KHz | 060R046 | 15 KHz | 020R000 | 4.7 | 4.7 | 14.40 |
| 15 KHz | 090R016 | 15 KHz | 030R000 | 5.5 | 5.5 | 21.60 |
| 15 KHz | 106R000 | 15 KHz | 050R000 | 5.7 | 5.9 | 28.08 |
| 15 KHz | 053R000 | 15 KHz | 108R000 | 5.7 | 5.7 | 28.98 |
| 15 kHz | 106R000 | 15 kHz | 150R000 | 6.3 | 6.5 | 46.08 |
| 15 KHz | 106R000 | 15 KHz | 216R000 | 5.5 | 5.7 | 57.96 |

| NR CC1 40 MHz | | NR CC2 40 MHz | | | | B (allocated RB portion in all aggregated CBW) |
|---|---|---|---|---|---|---|
| SCS | Allocated RB | SCS | Allocated RB | DFT-S-OFDM MPR | CP-OFDM MPR | |
| 15 KHz | 001R000 | 15 KHz | 001R215 | 14.5 | 14.6 | 0.36 |
| 15 KHz | 001R000 | 15 KHz | 001R000 | 14.3 | 14.4 | 0.36 |
| 15 KHz | 002R214 | 15 KHz | 001R000 | 13.6 | 13.7 | 0.54 |
| 15 KHz | 005R000 | 15 KHz | 001R215 | 13.8 | 13.8 | 1.08 |
| 15 KHz | 008R000 | 15 KHz | 002R214 | 13.0 | 13.0 | 1.80 |
| 15 KHz | 008R000 | 15 KHz | 003R213 | 12.0 | 12.2 | 1.98 |
| 15 KHz | 010R000 | 15 KHz | 003R213 | 12.0 | 12.0 | 2.34 |
| 15 KHz | 015R201 | 15 KHz | 001R000 | 11.0 | 11.1 | 2.88 |
| 15 KHz | 015R201 | 15 KHz | 004R000 | 10.5 | 10.8 | 3.42 |
| 15 KHz | 015R201 | 15 KHz | 006R000 | 10.2 | 10.3 | 3.78 |
| 15 KHz | 015R201 | 15 KHz | 010R000 | 10.0 | 10.1 | 4.50 |
| 15 KHz | 015R000 | 15 KHz | 015R000 | 8.8 | 8.8 | 5.40 |
| 15 KHz | 030R186 | 15 KHz | 002R000 | 8.0 | 8.0 | 5.76 |
| 15 KHz | 020R000 | 15 KHz | 020R196 | 7.7 | 7.8 | 7.20 |
| 15 KHz | 030R000 | 15 KHz | 024R192 | 7.5 | 7.5 | 9.72 |
| 15 KHz | 045R171 | 15 KHz | 020R000 | 4.9 | 4.8 | 11.70 |
| 15 KHz | 070R146 | 15 KHz | 030R000 | 4.1 | 4.0 | 18.00 |
| 15 KHz | 108R000 | 15 KHz | 001R000 | 4.0 | 4.0 | 19.62 |
| 15 KHz | 108R000 | 15 KHz | 108R000 | 3.4 | 3.4 | 38.88 |
| 15 KHz | 150R066 | 15 KHz | 070R000 | 2.6 | 2.7 | 39.60 |
| 15 KHz | 150R000 | 15 KHz | 150R066 | 2.4 | 2.4 | 54.00 |
| 15 kHz | 216R000 | 15 kHz | 216R000 | 3.0 | 3.0 | 77.76 |

| NR CC1 100 MHz | | NR CC2 100 MHz | | | | B (allocated RB portion in all aggregated CBW) |
|---|---|---|---|---|---|---|
| SCS | Allocated RB | SCS | Allocated RB | DFT-S-OFDM MPR | CP-OFDM MPR | |
| 30 KHz | 001R000 | 30 KHz | 001R272 | 15.0 | 15.0 | 0.72 |
| 30 KHz | 001R000 | 30 KHz | 001R000 | 14.4 | 14.6 | 0.72 |
| 30 KHz | 002R271 | 30 KHz | 001R000 | 14.2 | 14.0 | 1.08 |
| 30 KHz | 005R000 | 30 KHz | 002R271 | 12.8 | 12.8 | 2.52 |
| 30 KHz | 008R000 | 30 KHz | 003R270 | 11.1 | 11.2 | 3.96 |
| 30 KHz | 010R000 | 30 KHz | 003R270 | 10.0 | 10.1 | 4.68 |
| 30 KHz | 015R258 | 30 KHz | 001R000 | 9.0 | 9.1 | 5.76 |
| 30 KHz | 015R258 | 30 KHz | 004R000 | 8.1 | 8.3 | 6.84 |
| 30 KHz | 015R258 | 30 KHz | 006R000 | 8.2 | 8.2 | 7.56 |
| 30 KHz | 015R258 | 30 KHz | 010R000 | 7.0 | 7.0 | 9.00 |
| 30 KHz | 015R258 | 30 KHz | 013R000 | 5.6 | 5.6 | 10.08 |
| 30 KHz | 015R000 | 30 KHz | 015R000 | 5.2 | 5.3 | 10.80 |
| 30 KHz | 030R243 | 30 KHz | 002R000 | 5.2 | 5.2 | 11.52 |
| 30 KHz | 020R253 | 30 KHz | 015R000 | 5.0 | 5.0 | 12.60 |
| 30 KHz | 030R243 | 30 KHz | 008R000 | 4.8 | 4.8 | 13.68 |
| 30 KHz | 020R000 | 30 KHz | 020R253 | 4.4 | 4.4 | 14.40 |
| 30 KHz | 045R228 | 30 KHz | 020R000 | 3.4 | 3.5 | 23.40 |
| 30 KHz | 100R173 | 30 KHz | 030R000 | 2.7 | 2.5 | 46.80 |
| 30 KHz | 136R000 | 30 KHz | 001R000 | 4.4 | 4.5 | 49.32 |

TABLE 13-continued

| | | | | |
|---|---|---|---|---|
| 30 KHz 160R113 | 30 KHz 050R000 | 2.0 | 1.7 | 75.60 |
| 30 KHz 136R000 | 30 KHz 136R000 | 3.0 | 3.0 | 97.92 |
| 30 KHz 220R053 | 30 KHz 100R000 | 1.5 | 1.5 | 115.20 |
| 30 KHz 250R023 | 30 KHz 150R000 | 1.5 | 1.5 | 144.00 |
| 30 KHz 273R000 | 30 KHz 273R000 | 1.5 | 1.5 | 196.56 |

TABLE 14

| NR CC1 20 MHz | | NR CC2 40 MHz | | DFT-S-OFDM MPR | CP-OFDM MPR | B (allocated RB portion in all aggregated CBW) |
|---|---|---|---|---|---|---|
| SCS | Allocated RB | SCS | allocated RB | | | |
| 15 KHz | 001R000 | 15 KHz | 001R000 | 7.0 | 7.5 | 0.36 |
| 15 KHz | 002R104 | 15 KHz | 001R000 | 6.8 | 7.2 | 0.54 |
| 15 KHz | 005R000 | 15 KHz | 001R215 | 6.4 | 6.7 | 1.08 |
| 15 KHz | 008R098 | 15 KHz | 002R214 | 4.3 | 4.5 | 1.80 |
| 15 KHz | 008R098 | 15 KHz | 003R213 | 4.0 | 4.3 | 1.98 |
| 15 KHz | 010R096 | 15 KHz | 003R213 | 3.5 | 4.0 | 2.34 |
| 15 KHz | 008R000 | 15 KHz | 007R209 | 3.5 | 4.0 | 2.70 |
| 15 KHz | 015R091 | 15 KHz | 001R215 | 3.5 | 3.7 | 2.88 |
| 15 KHz | 015R091 | 15 KHz | 004R000 | 5.1 | 5.5 | 3.42 |
| 15 KHz | 015R091 | 15 KHz | 006R000 | 4.0 | 4.6 | 3.78 |
| 15 KHz | 015R091 | 15 KHz | 010R000 | 3.5 | 4.0 | 4.50 |
| 15 KHz | 015R000 | 15 KHz | 015R000 | 3.3 | 3.7 | 5.40 |
| 15 KHz | 030R076 | 15 KHz | 002R000 | 5.5 | 6.0 | 5.76 |
| 15 KHz | 020R000 | 15 KHz | 020R196 | 3.4 | 3.8 | 7.20 |
| 15 KHz | 053R000 | 15 KHz | 001R215 | 3.1 | 3.5 | 9.72 |
| 15 KHz | 045R061 | 15 KHz | 020R000 | 3.1 | 3.5 | 11.70 |
| 15 KHz | 060R046 | 15 KHz | 020R000 | 3.3 | 3.6 | 14.40 |
| 15 KHz | 090R016 | 15 KHz | 030R000 | 3.3 | 3.8 | 21.60 |
| 15 KHz | 106R000 | 15 KHz | 050R000 | 3.5 | 3.5 | 28.08 |
| 15 KHz | 053R000 | 15 KHz | 108R000 | 3.3 | 3.8 | 28.98 |
| 15 kHz | 106R000 | 15 kHz | 150R000 | 3.5 | 4.0 | 46.08 |
| 15 KHz | 106R000 | 15 KHz | 216R000 | 3.5 | 3.5 | 57.96 |

| NR CC1 40 MHz | | NR CC2 40 MHz | | DFT-S-OFDM MPR | CP-OFDM MPR | B (allocated RB portion in all aggregated CBW) |
|---|---|---|---|---|---|---|
| SCS | Allocated RB | SCS | Allocated RB | | | |
| 15 KHz | 001R215 | 15 KHz | 001R000 | 5.3 | 5.5 | 0.36 |
| 15 KHz | 001R000 | 15 KHz | 001R000 | 5.0 | 5.0 | 0.36 |
| 15 KHz | 002R214 | 15 KHz | 001R000 | 5.0 | 5.2 | 0.54 |
| 15 KHz | 005R000 | 15 KHz | 001R215 | 5.0 | 5.2 | 1.08 |
| 15 KHz | 008R000 | 15 KHz | 002R214 | 4.5 | 4.8 | 1.80 |
| 15 KHz | 008R000 | 15 KHz | 003R213 | 4.2 | 4.3 | 1.98 |
| 15 KHz | 010R000 | 15 KHz | 003R213 | 4.0 | 4.3 | 2.34 |
| 15 KHz | 015R201 | 15 KHz | 001R000 | 3.5 | 3.8 | 2.88 |
| 15 KHz | 015R201 | 15 KHz | 004R000 | 3.6 | 3.7 | 3.42 |
| 15 KHz | 015R201 | 15 KHz | 006R000 | 3.3 | 3.4 | 3.78 |
| 15 KHz | 015R201 | 15 KHz | 010R000 | 3.5 | 3.7 | 4.50 |
| 15 KHz | 015R000 | 15 KHz | 015R000 | 3.5 | 4.0 | 5.40 |
| 15 KHz | 030R186 | 15 KHz | 002R000 | 3.2 | 3.2 | 5.76 |
| 15 KHz | 020R000 | 15 KHz | 020R196 | 3.0 | 3.2 | 7.20 |
| 15 KHz | 030R000 | 15 KHz | 024R192 | 3.0 | 3.2 | 9.72 |
| 15 KHz | 045R171 | 15 KHz | 020R000 | 2.0 | 2.2 | 11.70 |
| 15 KHz | 070R146 | 15 KHz | 030R000 | 2.0 | 2.2 | 18.00 |
| 15 KHz | 108R000 | 15 KHz | 001R000 | 2.0 | 2.7 | 19.62 |
| 15 KHz | 108R000 | 15 KHz | 108R000 | 2.2 | 2.7 | 38.88 |
| 15 KHz | 150R066 | 15 KHz | 070R000 | 2.2 | 2.3 | 39.60 |
| 15 KHz | 150R000 | 15 KHz | 150R066 | 2.0 | 2.0 | 54.00 |
| 15 kHz | 216R000 | 15 kHz | 216R000 | 2.0 | 2.0 | 77.76 |

TABLE 14-continued

| NR CC1 100 MHz | | NR CC2 100 MHz | | DFT-S-OFDM MPR | CP-OFDM MPR | B (allocated RB portion in all aggregated CBW) |
|---|---|---|---|---|---|---|
| SCS | Allocated RB | SCS | Allocated RB | | | |
| 30 KHz | 001R000 | 30 KHz | 001R272 | 5.4 | 5.7 | 0.72 |
| 30 KHz | 001R000 | 30 KHz | 001R000 | 5.0 | 5.2 | 0.72 |
| 30 KHz | 002R271 | 30 KHz | 001R000 | 5.0 | 5.2 | 1.08 |
| 30 KHz | 005R000 | 30 KHz | 002R271 | 4.7 | 5.0 | 2.52 |
| 30 KHz | 008R000 | 30 KHz | 003R270 | 4.7 | 4.8 | 3.96 |
| 30 KHz | 010R000 | 30 KHz | 003R270 | 4.4 | 4.5 | 4.68 |
| 30 KHz | 015R258 | 30 KHz | 001R000 | 4.2 | 4.2 | 5.76 |
| 30 KHz | 015R258 | 30 KHz | 004R000 | 3.3 | 3.3 | 6.84 |
| 30 KHz | 015R258 | 30 KHz | 006R000 | 3.0 | 3.2 | 7.56 |
| 30 KHz | 015R258 | 30 KHz | 010R000 | 3.0 | 3.0 | 9.00 |
| 30 KHz | 015R258 | 30 KHz | 013R000 | 3.0 | 3.0 | 10.08 |
| 30 KHz | 015R000 | 30 KHz | 015R000 | 2.8 | 2.7 | 10.80 |
| 30 KHz | 030R243 | 30 KHz | 002R000 | 3.4 | 3.5 | 11.52 |
| 30 KHz | 020R253 | 30 KHz | 015R000 | 2.7 | 2.8 | 12.60 |
| 30 KHz | 030R243 | 30 KHz | 008R000 | 2.5 | 2.5 | 13.68 |
| 30 KHz | 020R000 | 30 KHz | 020R253 | 2.5 | 2.5 | 14.40 |
| 30 KHz | 045R228 | 30 KHz | 020R000 | 2.5 | 2.5 | 23.40 |
| 30 KHz | 100R173 | 30 KHz | 030R000 | 2.0 | 2.3 | 46.80 |
| 30 KHz | 136R000 | 30 KHz | 001R000 | 2.3 | 2.5 | 49.32 |
| 30 KHz | 160R113 | 30 KHz | 050R000 | 1.4 | 1.4 | 75.60 |
| 30 KHz | 136R000 | 30 KHz | 136R000 | 2.2 | 2.3 | 97.92 |
| 30 KHz | 220R053 | 30 KHz | 100R000 | 1.0 | 1.0 | 115.20 |
| 30 KHz | 250R023 | 30 KHz | 150R000 | 1.0 | 1.0 | 144.00 |
| 30 KHz | 273R000 | 30 KHz | 273R000 | 1.0 | 1.0 | 196.56 |

Figure 12:
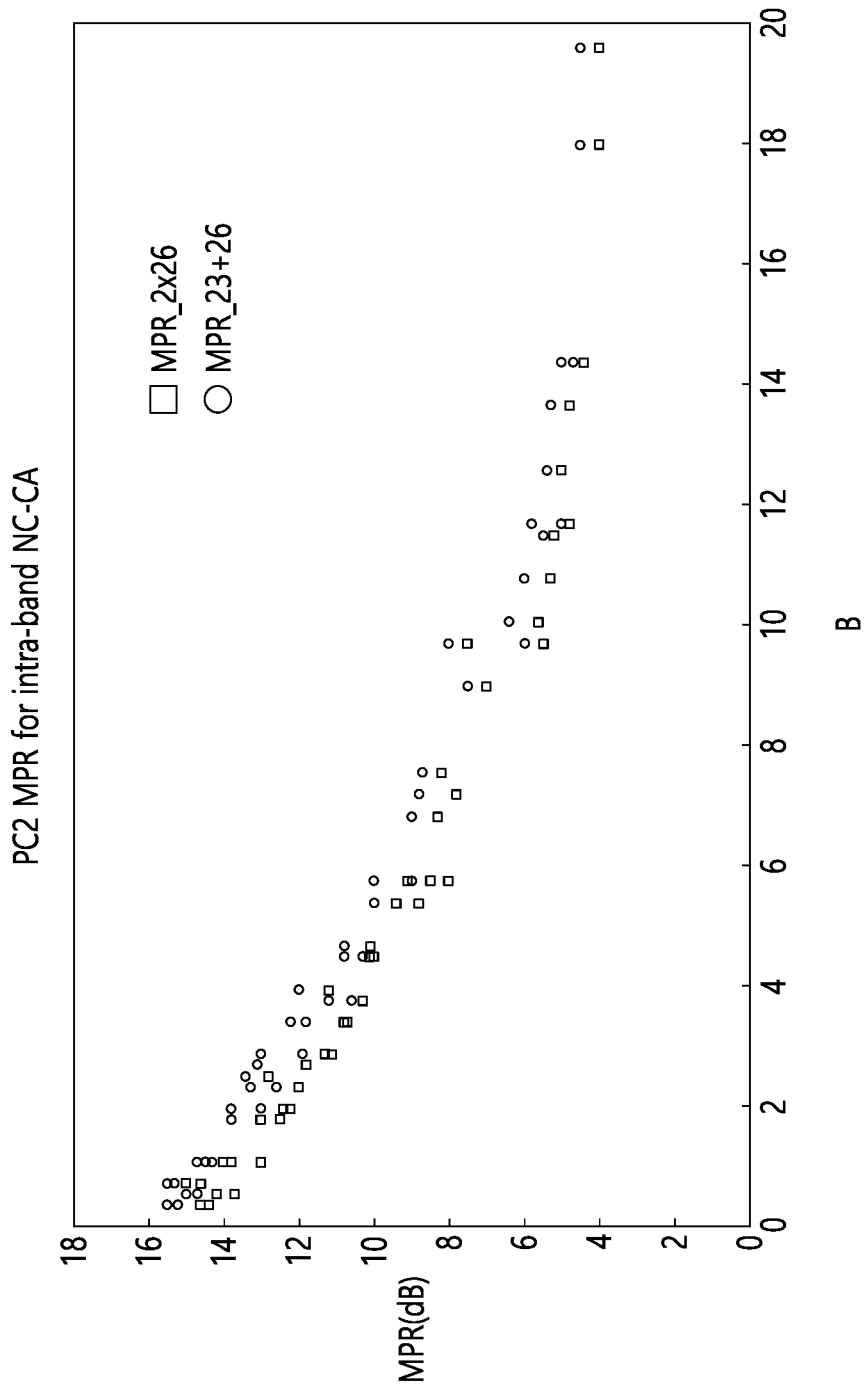
FIG. 12 shows comparison MPR levels according to PA architecture.

FIG. 12 shows comparison MPR levels according to PA architecture.

Based on the above MPR results. It is seen that the delta MPR value is not quite different as shown in the FIG. 12 between #1 PA architecture and #4 PA architecture for PC2 NR intra-band non-contiguous RB allocation.

Based on MPR results, the delta MPR value is not quite different (up to 1.5 dB) between #1 PA architecture and #4 PA architecture.

3. MPR

Based on the above results, following MPR requirements for PC2 NR intra-band non-contiguous CA UE may be proposed.

3-1. $MPR_{IM3}$ to meet −30 dBm/MHz

The IM3 component by the UE's uplink signal transmission may have to satisfy −30 dB m/MHz.

The IM3 component in the uplink signal of the UE with the below MPR may not exceed −30 dBm/MHz.

MPR is for intra-band non-contiguous CA power class 2 for UEs indicating IE dualPA-Architecture supported. The allowed maximum output power reduction is defined as follows.

$M_A$ may be MPR. MA may be based on B as table 15.

TABLE 15

| | $M_A$ |
|---|---|
| 0 ≤ B < 1.08 | 16 |
| 1.08 ≤ B < 2.88 | 15.0 |
| 2.88 ≤ B < 5.40 | 14.0 |
| 5.40 ≤ B < 9.72 | 12.0 |
| 9.72 ≤ B < 16.38 | 10.5 |
| 16.38 ≤ B | 9.0 |

B = ($L_{CRB\_alloc, 1}$* 12* $SCS_1$ + $L_{CRB\_alloc, 2}$ * 12 * $SCS_2$)/1,000,000

Signal transmission through RBs allocated to CC1 and CC2 may be configured for CA.

A value obtained by normalizing the sum of the RB size allocated to CC1 and the RB size allocated to CC2 to 1 MHz may be B.

$L_{CRB\_alloc, 1}$ may correspond to the number of RBs allocated to CC1, and $L_{CRB\_alloc, 2}$ may correspond to the number of RBs allocated to CC2.

SCS1 may be a subcarrier spacing (SCS) for CC1, and SCS2 may correspond to an SCS for CC2.

The size of the RB is 12*SCS.

Accordingly, $L_{CRB\_alloc, 1}$*12*$SCS_1$ may be the RB size allocated to CC1, and +$L_{CRB\_alloc, 2}$*12*$SCS_2$ may be the RB size allocated to CC2.

3-2. MPRIM3 to meet −13 dBm/MHz

The IM3 component by the UE's uplink signal transmission may have to satisfy −13 dBm/MHz.

The IM3 component in the uplink signal of the UE with the below MPR may not exceed −13 dBm/MHz.

MPR is for intra-band non-contiguous CA power class 2 for UEs indicating IE dualPA-Architecture supported. The allowed maximum output power reduction is defined as follows.

MA may be MPR. $M_A$ may be based on B as table 16.

TABLE 16

| | $M_A$ |
|---|---|
| 0 ≤ B < 0.54 | 9 |
| 0.54 ≤ B < 1.08 | 8 |
| 1.08 ≤ B < 2.16 | 7 |
| 2.16 ≤ B < 3.24 | 6.5 |
| 3.24 ≤ B < 5.4 | 5.5 |
| 5.4 ≤ B | 4 |

B = ($L_{CRB\_alloc, 1}$* 12* $SCS_1$ + $L_{CRB\_alloc, 2}$ * 12 * $SCS_2$)/1,000,000

Signal transmission through RBs allocated to CC1 and CC2 may be configured for CA.

A value obtained by normalizing the sum of the RB size allocated to CC1 and the RB size allocated to CC2 to 1 MHz may be B.

$L_{CRB\_alloc,\ 1}$ may correspond to the number of RBs allocated to CC1, and $L_{CRB\_alloc,\ 2}$ may correspond to the number of RBs allocated to CC2.

$SCS_1$ may be a subcarrier spacing (SCS) for CC1, and $SCS_2$ may correspond to an SCS for CC2.

The size of the RB is 12*SCS.

Accordingly, $L_{CRB\_alloc,\ 1}*12*SCS_1$ may be the RB size allocated to CC1, and $+L_{CRB\_alloc,\ 2}*12*SCS_2$ may be the RB size allocated to CC2.

4. Other Issues

For the #4 architecture, RAN4 may discuss whether or not need the PA swapping time from one CC to two CC as follow PA swap time for 1×23 dBm+1×26 dBm+2LO with 100 MHz BW may be one of options 1-3.

Option 1: define new swap time specifically for this architecture

Option 2: swap time is 0us

Option 3: 0us or 35 us or 140 us

In our understanding, the PA swapping time may not need for intra-band non-contiguous CA since each PA per CC always operated for intra-band non-contiguous CA operation.

The swapping time may be needed when CA UE fallback to single CC or the UE support UL-MIMO without CA operation.

Therefore, it may be not needed to define the PA swapping time for intra-band NC-CA UE.

The PA swapping time may not need for intra-band non-contiguous CA since each PA per CC operate for intra-band non-contiguous CA operation.

For the in-gap emission requirements, 3 candidate options as follow may be proposed.

For 1×26 dBm PA+1LO with 200 MHz BW and 2×23 dBm PA+1LO with 200 MHz BW, when LO or image fall inside, method to handle in-gap requirement may be one of options 1-3.

Option 1: Reuse in-gap exception under some conditions (e.g. Sync) as defined for PC3

Option 2: use MPR to meet in-gap emission requirement

Option 3: other

In these options, option1 as same PC3 intra-band non-contiguous CA UE may be preferred.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 13:
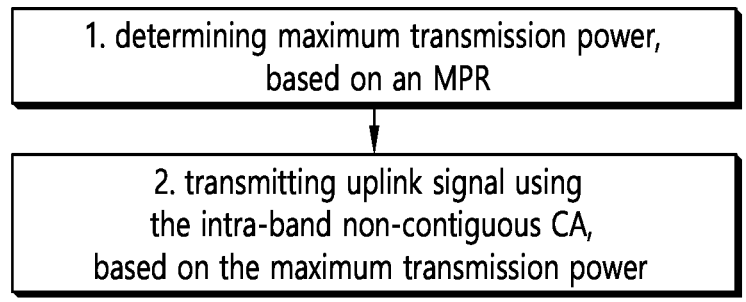
FIG. 13 shows a procedure of UE according to the disclosure of the present specification.

FIG. 13 shows a procedure of UE according to the disclosure of the present specification.

1. The UE may determine maximum transmission power, based on an MPR (Maximum Power Reduction).
2. The UE may transmit uplink signal using the intra-band non-contiguous CA, based on the maximum transmission power.

The device may support PC2 (Power Class 2).

The device may be equipped with dual power amplifier.

The device may be configured with intra-band non-contiguous CA.

The intra-band non-contiguous CA may be configured to use a first CC (component carrier) and a second CC.

The MPR may be based on i) maximum emission requirement and ii) a parameter B.

The maximum emission requirement is the maximum value of spectral emission mask of the device including the allowed emission due to IM3 (3rd inter-modulation).

The parameter B may be defined as $(L_{CRB\_alloc,\ 1}*12*SCS_1+L_{CRB\_alloc,\ 2}*12*SCS_2)/1,000,000$.

The $L_{CRB\_alloc,\ 1}$ may be an allocated number of RBs (resource blocks) in the first CC.

The $L_{CRB\_alloc,\ 2}$ may be an allocated number of RBs in the second CC.

The $SCS_1$ may be a configured subcarrier spacing in the first CC.

The $SCS_2$ may be a configured subcarrier spacing in the second CC.

The maximum emission requirement may be −13 dBm/MHz.

The MPR may be 9, based on the parameter B being greater than or equal to 0 and less than 0.54.

The MPR may be 8, based on the parameter B being greater than or equal to 0.54 and less than 1.08.

The MPR may be 7, based on the parameter B being greater than or equal to 1.08 and less than 2.16.

The MPR may be 6.5, based on the parameter B being greater than or equal to 2.16 and less than 3.24.

The MPR may be 5.5, based on the parameter B being greater than or equal to 3.24 and less than 5.4.

The MPR may be 4, based on the parameter B being greater than or equal to 5.4.

The maximum emission requirement may be −30 dBm/MHz.

The MPR may be 16, based on the parameter B being greater than or equal to 0 and less than 1.08.

The MPR may be 15.0, based on the parameter B being greater than or equal to 1.08 and less than 2.88.

The MPR may be 14.0, based on the parameter B being greater than or equal to 2.88 and less than 5.40.

The MPR may be 12.0, based on the parameter B being greater than or equal to 5.40 and less than 9.72.

The MPR may be 10.5, based on the parameter B being greater than or equal to 9.72 and less than 16.38.

The MPR may be 9.0, based on the parameter B being greater than or equal to 16.38.

Hereinafter, a device configured to operate in a wireless system and to support PC2 (Power Class 2), according to some embodiments of the present disclosure, will be described.

For example, a terminal may include a processor, a transceiver, and a memory.

For example, the processor may be configured to be coupled operably with the memory and the processor.

The processor may be configured to control the transceiver to determine maximum transmission power, based on MPR(Maximum Power Reduction); transmit uplink signal using the intra-band non-contiguous CA, based on the maximum transmission power, wherein the device supports PC2 (Power Class 2), wherein the device is equipped with dual power amplifier, wherein the device is configured with intra-band non-contiguous CA, wherein the intra-band non-contiguous CA is configured to use a first CC(component carrier) and a second CC; and wherein the MPR is based on i) maximum emission requirement and ii) a parameter B, wherein the maximum emission requirement is the maximum value of spectral emission mask of the device including the allowed emission due to IM3 (3rd inter-modulation), wherein the parameter B is defined as $(L_{CRB\_alloc,\ 1}*12*SCS_1+L_{CRB\_alloc,\ 2}*12*SCS_2)/1,000,000$, wherein the $L_{CRB\_alloc,\ 1}$ is an allocated number of RBs (resource blocks) in the first CC, wherein the $L_{CRB\_alloc,\ 2}$ is an allocated number of RBs in the second CC, wherein the $SCS_1$ is a configured subcarrier spacing in the first CC, wherein the $SCS_2$ is a configured subcarrier spacing in the second CC.

Hereinafter, a processor in a wireless communication system, according to some embodiments of the present disclosure, will be described.

The processor may be configured to control the transceiver to determine maximum transmission power, based on MPR(Maximum Power Reduction); transmit uplink signal using the intra-band non-contiguous CA, based on the maximum transmission power, wherein the device supports PC2 (Power Class 2), wherein the device is equipped with dual power amplifier, wherein the device is configured with intra-band non-contiguous CA, wherein the intra-band non-contiguous CA is configured to use a first CC(component carrier) and a second CC; and wherein the MPR is based on i) maximum emission requirement and ii) a parameter B, wherein the maximum emission requirement is the maximum value of spectral emission mask of the device including the allowed emission due to IM3 (3rd inter-modulation), wherein the parameter B is defined as $(L_{CRB\_alloc,\ 1}*12*SCS_1+L_{CRB\_alloc,\ 2}*12*SCS_2)/1{,}000{,}000$, wherein the $L_{CRB\_alloc,\ 1}$ is an allocated number of RBs (resource blocks) in the first CC, wherein the $L_{CRB\_alloc,\ 2}$ is an allocated number of RBs in the second CC, wherein the $SCS_1$ is a configured subcarrier spacing in the first CC, wherein the $SCS_2$ is a configured subcarrier spacing in the second CC.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored a plurality of instructions may cause the terminal to determine maximum transmission power, based on MPR(Maximum Power Reduction); transmit uplink signal using the intra-band non-contiguous CA, based on the maximum transmission power, wherein the device supports PC2 (Power Class 2), wherein the device is equipped with dual power amplifier, wherein the device is configured with intra-band non-contiguous CA, wherein the intra-band non-contiguous CA is configured to use a first CC(component carrier) and a second CC; and wherein the MPR is based on i) maximum emission requirement and ii) a parameter B, wherein the parameter B is defined as $(L_{CRB\_alloc,\ 1}*12*SCS_1+L_{CRB\_alloc,\ 2}*12*SCS_2)/1{,}000{,}000$, wherein the $L_{CRB\_alloc,\ 1}$ is an allocated number of RBs (resource blocks) in the first CC, wherein the $L_{CRB\_alloc,\ 2}$ is an allocated number of RBs in the second CC, wherein the $SCS_1$ is a configured subcarrier spacing in the first CC, wherein the $SCS_2$ is a configured subcarrier spacing in the second CC.

The present disclosure can have various advantageous effects.

For example, by performing disclosure of this specification, UE can transmit uplink signal with MPR.

Advantageous effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A device configured to operate in a wireless system and to support PC2 (Power Class 2), the device comprising: a transceiver configured with intra-band non-contiguous (CA), wherein the transceiver is equipped with dual power amplifier, wherein the intra-band non-contiguous CA is configured to use a first CC(component carrier) and a second CC; and a processor operably connectable to the transceiver, wherein the processor is configured to: determine maximum transmission power, based on an MPR (Maximum Power Reduction), transmit uplink signal using the intra-band non-contiguous CA, based on the maximum transmission power, wherein the MPR is based on i) maximum emission requirement and ii) a parameter B, wherein the maximum emission requirement is the maximum value of spectral emission mask of the device including the allowed emission due to IM3 (3rd inter-modulation), wherein the parameter B is defined as (LCRB_alloc,1* 12*SCSI+LCRB_alloc,2*12*SCS$_2$)/1,000,000, wherein the LCRB_alloc,1is an allocated number of RBs (resource blocks) in the first CC, wherein the LCRB_allo$_c$,2is an allocated number of RBs in the second CC, wherein the SCSi is a configured subcarrier spacing in the first CC, wherein the SCS$_2$ is a configured subcarrier spacing in the second CC.

2. The device of claim 1,
wherein the maximum emission requirement is −13 dBm/MHz,
wherein the MPR is 9, based on the parameter B being greater than or equal to 0 and less than 0.54,
wherein the MPR is 8, based on the parameter B being greater than or equal to 0.54 and less than 1.08,
wherein the MPR is 7, based on the parameter B being greater than or equal to 1.08 and less than 2.16,
wherein the MPR is 6.5, based on the parameter B being greater than or equal to 2.16 and less than 3.24,
wherein the MPR is 5.5, based on the parameter B being greater than or equal to 3.24 and less than 5.4,
wherein the MPR is 4, based on the parameter B being greater than or equal to 5.4.

3. The device of claim 1,
wherein the maximum emission requirement is −30 dBm/MHz,
wherein the MPR is 16, based on the parameter B being greater than or equal to 0 and less than 1.08,
wherein the MPR is 15.0, based on the parameter B being greater than or equal to 1.08 and less than 2.88,
wherein the MPR is 14.0, based on the parameter B being greater than or equal to 2.88 and less than 5.40,
wherein the MPR is 12.0, based on the parameter B being greater than or equal to 5.40 and less than 9.72,
wherein the MPR is 10.5, based on the parameter B being greater than or equal to 9.72 and less than 16.38,
wherein the MPR is 9.0, based on the parameter B being greater than or equal to 16.38.

4. A method for operating in a wireless system, performed by a device, the method comprising: wherein the device supports PC2 (Power Class 2), wherein the device is equipped with dual power amplifier, wherein the device is configured with intra-band non-contiguous (CA), wherein the intra-band non-contiguous CA is configured to use a first CC (component carrier) and a second CC, determining maximum transmission power, based on an MPR (Maximum Power Reduction); transmitting uplink signal using the intra-band non-contiguous CA, based on the maximum transmission power, wherein the MPR is based on i) maximum emission requirement and ii) a parameter B, wherein the maximum emission requirement is the maximum value of spectral emission mask of the device including the allowed emission due to IM3 (3rd inter-modulation), wherein the parameter B is defined as (LCRB_alloc,1*12*SCSI+LCRB_alloc,2*12*SCS$_2$)/1,000,000, wherein the LCRB_$_a$lloc,1is an allocated number of RBs (resource blocks) in the first CC, wherein the LCRB_alloc, 2is an allocated number of RBs in the second CC, wherein the SCSI is a configured subcarrier spacing in the first CC, wherein the SCS$_2$ is a configured subcarrier spacing in the second CC.

5. The method of claim 4,
wherein the maximum emission requirement is −13 dBm/MHz,
wherein the MPR is 9, based on the parameter B being greater than or equal to 0 and less than 0.54,
wherein the MPR is 8, based on the parameter B being greater than or equal to 0.54 and less than 1.08,
wherein the MPR is 7, based on the parameter B being greater than or equal to 1.08 and less than 2.16,
wherein the MPR is 6.5, based on the parameter B being greater than or equal to 2.16 and less than 3.24,
wherein the MPR is 5.5, based on the parameter B being greater than or equal to 3.24 and less than 5.4,
wherein the MPR is 4, based on the parameter B being greater than or equal to 5.4.

6. The method of claim 4
wherein the maximum emission requirement is −30 dBm/MHz,
wherein the MPR is 16, based on the parameter B being greater than or equal to 0 and less than 1.08,
wherein the MPR is 15.0, based on the parameter B being greater than or equal to 1.08 and less than 2.88,
wherein the MPR is 14.0, based on the parameter B being greater than or equal to 2.88 and less than 5.40,
wherein the MPR is 12.0, based on the parameter B being greater than or equal to 5.40 and less than 9.72,
wherein the MPR is 10.5, based on the parameter B being greater than or equal to 9.72 and less than 16.38,
wherein the MPR is 9.0, based on the parameter B being greater than or equal to 16.38.

7. At least one non-transitory computer readable medium storing instructions that, based on being executed by at least one processor, perform operations comprising: wherein the device supports PC2 (Power Class 2), wherein the device is equipped with dual power amplifier, wherein the device is configured with intra-band non-contiguous (CA), wherein the intra-band non-contiguous CA is configured to use a first CC(component carrier) and a second CC, determining maximum transmission power, based on an MPR(Maximum Power Reduction); transmitting uplink signal using the intra-band non-contiguous CA, based on the maximum transmission power, wherein the MPR is based on i) maximum emission requirement and ii) a parameter B, wherein the maximum emission requirement is the maximum value of spectral emission mask of the device including the allowed emission due to IM3 (3rd inter-modulation), wherein the parameter B is defined as (LCRB_alloc,1*12*SCSI+LCRB_alloc,2*12*SCS2)/1,000,000, wherein the LCRB_alloc, 1is an allocated number of RBs (resource blocks) in the first CC, wherein the LCRB_alloc,2is an allocated number of RBs in the second CC, wherein the SCSi is a configured subcarrier spacing in the first CC, wherein the SCS$_2$ is a configured subcarrier spacing in the second CC.

* * * * *